US008965083B2

(12) United States Patent
Ben Ayed et al.

(10) Patent No.: US 8,965,083 B2
(45) Date of Patent: Feb. 24, 2015

(54) AUTOMATIC DETECTION OF VERTEBRAE BOUNDARIES IN SPINE IMAGES

(75) Inventors: Ismail Ben Ayed, London (CA); Kumaradevan Punithakumar, Hamilton (CA); Sukhdeep Gill, London (CA); Gregory John Garvin, London (CA)

(73) Assignees: General Electric Company, Schenectady, NY (US); London Health Sciences Centre, London (CA)

( * ) Notice: Subject to any disclaimer, the term of this patent is extended or adjusted under 35 U.S.C. 154(b) by 225 days.

(21) Appl. No.: 13/535,900

(22) Filed: Jun. 28, 2012

(65) Prior Publication Data

US 2014/0003684 A1    Jan. 2, 2014

(51) Int. Cl.
G06K 9/00 (2006.01)
G06K 9/34 (2006.01)
G06K 9/68 (2006.01)

(52) U.S. Cl.
USPC ............ 382/128; 382/132; 382/173; 382/218

(58) Field of Classification Search
CPC ............... G06T 7/0012; G06T 7/0079; G06T 2207/20112; G06T 2207/20101
USPC .......................... 382/173, 132, 218
See application file for complete search history.

(56) References Cited

U.S. PATENT DOCUMENTS

| | | | |
|---|---|---|---|
| 6,249,590 B1 | 6/2001 | Young et al. | |
| 6,608,917 B1 | 8/2003 | Wei et al. | |
| 7,233,330 B2 * | 6/2007 | Moreau-Gobard et al. | .. 345/424 |
| 7,561,728 B2 | 7/2009 | Abufadel et al. | |
| 7,787,678 B2 * | 8/2010 | Unal et al. | ..................... 382/128 |
| 7,804,986 B2 | 9/2010 | Lai et al. | |
| 7,903,851 B2 | 3/2011 | Reisman et al. | |
| 8,014,575 B2 | 9/2011 | Weiss et al. | |
| 8,571,282 B2 * | 10/2013 | Davydov | ....................... 382/128 |
| 2005/0020942 A1 | 1/2005 | Wada et al. | |
| 2008/0044074 A1 | 2/2008 | Jerebko et al. | |
| 2008/0132784 A1 | 6/2008 | Porat et al. | |
| 2011/0058720 A1 | 3/2011 | Lu et al. | |
| 2011/0130653 A1 | 6/2011 | Wang | |
| 2011/0225530 A1 | 9/2011 | Osmundson et al. | |

OTHER PUBLICATIONS

Ayed, I.B.; Hua-mei Chen; Punithakumar, K.; Ross, I.; Shuo Li, "Graph cut segmentation with a global constraint: Recovering region distribution via a bound of the Bhattacharyya measure," Computer Vision and Pattern Recognition (CVPR), 2010 IEEE Conference on , vol., no., pp. 3288,3295, Jun. 13-18, 2010.*

Viet-Quoc Pham; Takahashi, K.; Naemura, T., "Foreground-background segmentation using iterated distribution matching," Computer Vision and Pattern Recognition (CVPR), 2011 IEEE Conference on , vol., no., pp. 2113,2120, Jun. 20-25, 2011.*

(Continued)

*Primary Examiner* — Utpal Shah

(57) ABSTRACT

Methods and apparatus are disclosed to automatically detect vertebrae boundaries in a spine image. A method to detect a vertebra in a spine image is described, the method comprising generating a rectangle approximation of a reference vertebra. The method also including identifying a mask similar to the rectangle approximation and labeling a mask region in the mask. The method also including comparing the mask region to the rectangle approximation and detecting a vertebra in the spine image based on the comparison.

25 Claims, 15 Drawing Sheets

(56) References Cited

OTHER PUBLICATIONS

Ben Ayed et al., "Graph Cuts with Invariant Object-Interaction Priors: Application to Intervertebral Disc Segmentation," Information Processing in Medical Imaging 2011 (IPMI 2011), LNCS 6801, Jun. 2011, pp. 221-232 (12 pages).

Myronenko et al., "Non-Rigid Point Set Registration: Coherent Point Drift," Advances in Neural Information Processing Systems, 2006, pp. 1009-1016 (8 pages).

* cited by examiner

AUTOMATIC DETECTION OF VERTEBRAE BOUNDARIES IN SPINE IMAGES

FIELD OF THE DISCLOSURE

This disclosure relates generally to imaging solutions, and, more particularly, to methods and systems to automatically detect vertebrae boundaries in spine images.

BACKGROUND

Precise detection of the boundaries of spine vertebrae in magnetic resonance images is useful in quantifying spinal deformities and intervertebral disc diseases.

BRIEF SUMMARY

Certain examples provide methods and systems to detect a vertebra in a spine image. An example method includes generating a rectangle approximation of a reference vertebra. The example method includes identifying a mask with similar characteristics to the rectangle approximation and labeling a mask region in the mask. The example method includes comparing the mask region to the rectangle approximation and detecting a vertebra in the spine image based on the comparison.

Another example method includes determining whether a spine image is included in a series of images. The example method includes generating a rectangle approximation of a reference vertebra in the spine image. The example method includes identifying a mask similar to the rectangle approximation based on a comparison of image intensity and labeling mask regions in the mask based on a comparison of pixel intensity. The example method includes generating a window including a portion of the mask and comparing a plurality of mask regions within the window to the rectangle approximation based on the shape of each mask region and the shape of the rectangle approximation. The example method includes identifying the mask region closest to the shape of the rectangle approximation as a vertebra and labeling the location of the vertebra in the remaining images in the series of images when the spine image is included in a series of images.

Another example includes a computer readable storage medium including computer program code to be executed by a processor, the computer program code, when executed, to implement a method to detect a vertebra in a spine image. The example method includes generating a rectangle approximation of a reference vertebra in the spine image. The example method includes identifying a mask similar to the rectangle approximation and labeling a mask region in the mask. The example method includes generating a window including a portion of the mask and comparing a mask region within the mask to the rectangle approximation. The example method includes determining whether the mask region is a vertebra based on the comparison

Figure 1:
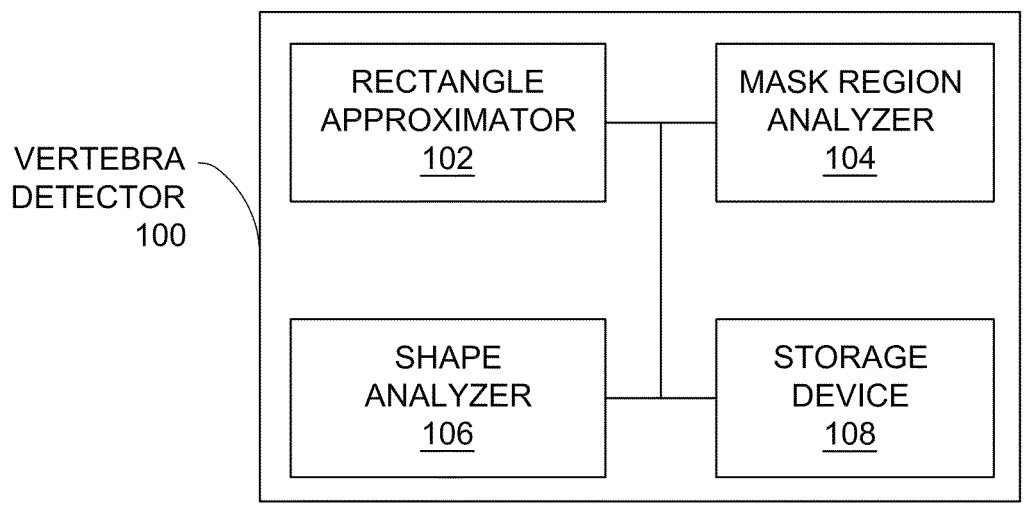
FIG. 1 is a block diagram of a first example implementation of a vertebra detector.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Current clinical approaches to detect boundaries of spine vertebrae in magnetic resonance images are based on visual inspection and/or manual tracing. Manual tracing is prohibitively time-consuming and, therefore, automatic or semi-automatic methods are highly desirable. The problem is difficult because of 1) the similarity in intensity profiles between vertebral regions and other irrelevant, non-vertebral regions, 2) the intensity inhomogeneity that occurs within the vertebrae, and 3) a strong level of imaging noise in many instances. Therefore, image (or intensity) information by itself is not sufficient. Additionally, comparing images of a subject over a period of time allows detecting changes, for example, of a tumor. However, the number of images in a series of images of the subject may be larger than 100 images. Labeling landmarks in each of these images is too costly.

Vertebra boundary detection allows quantitative and reproducible reporting of spinal diseases and/or deformities. Detecting vertebrae boundaries is useful in calculating diagnosis measures such as vertebrae dimensions, disc dimensions, disc intensity statistics, and benchmark points for disc bulging. User input is sometimes used to identify the boundary of a reference vertebra on a reference image of a spine. For example, a healthcare practitioner (e.g., a radiologist, physician and/or technician) may utilize a computer mouse to select corners on the boundary of a reference vertebra (e.g., a T12 vertebra) in a displayed sagittal image of a spine. This user input is used to approximate the boundary of the reference vertebra. For example, a rectangle is approximated tracing the boundary of a reference vertebra based on the user input corners.

Certain characteristics relating to the reference vertebra may be calculated based on the approximated rectangle. For example, a statistical distribution model may be generated describing the pixel intensity of the reference vertebra. Regions in the sagittal image of the spine with similar pixel intensities to the reference vertebra may be identified. Additionally and/or alternatively, a statistical model may be generated describing the shape of the reference vertebra. Comparing regions in the spine image with similar pixel intensities and a similar shape may automatically identify additional vertebrae displayed in the spine image.

Example methods and systems disclosed herein enable automated, accurate, fast and reproducible detection of vertebrae boundaries in spine images. Examples disclosed herein are particularly useful in connection with automatically detecting vertebrae boundaries in spine images based on minimal user input. Additional example methods and systems disclosed herein enable the automatic propagation of the detected vertebrae boundaries through a series of images.

Figure 2:
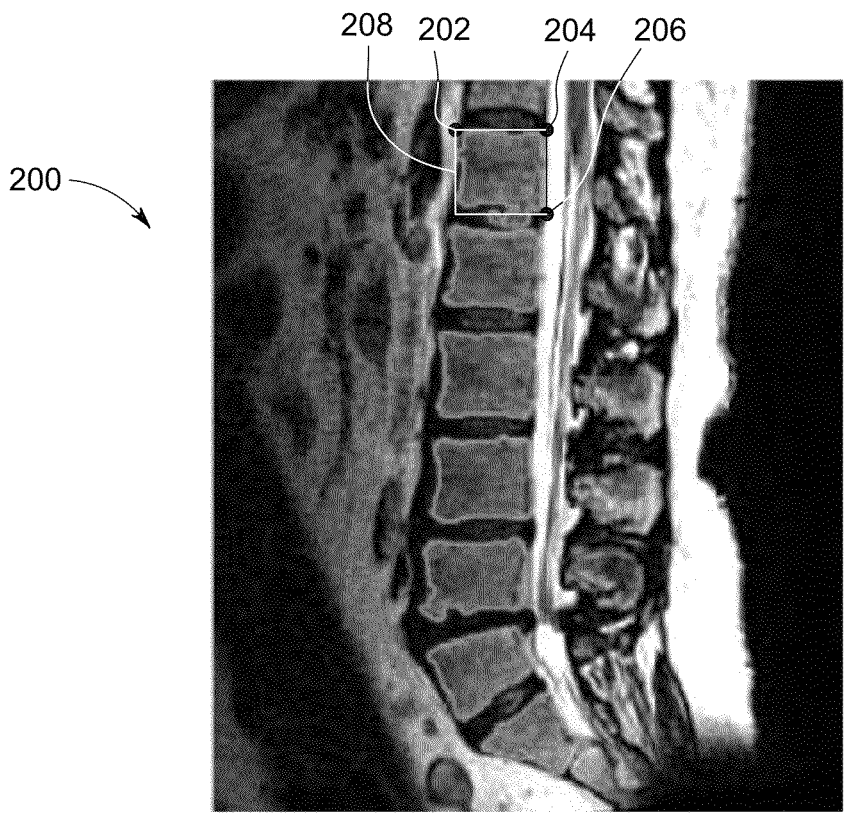
FIG. 2 is an example image of a sagittal view of a spine.

FIG. 1 is a block diagram of an example implementation of an example vertebra detector 100. In the illustrated example, the vertebra detector 100 is used to identify vertebrae boundaries in a spine image based on minimal user input on a reference (e.g., an initial) vertebra in the spine image. As described above, the identified vertebrae boundaries are used to calculate several diagnosis measures relating to the spine in the image, such as vertebrae dimensions, disc dimensions, disc intensity and disc bulging benchmarks. User input received by the example vertebra detector 100 is communicated to an example rectangle approximator 102. FIG. 2 is an example sagittal image of a spine 200. In the illustrated example of FIG. 2, the user (e.g., a healthcare practitioner such as a radiologist, a physician and/or a technician) has selected first through third corners 202-206. The example rectangle approximator 102 calculates a rectangle approximation along the boundary of the reference vertebra based on the three points. In the illustrated example of FIG. 2, the rectangle approximation 208 is generated by the example rectangle approximator 102. Knowing the boundary of the reference vertebra (e.g., the rectangle approximation) allows calculating other characteristics of the reference vertebra. For example, the distribution of pixel values within the reference vertebra may be calculated. Additionally, the general shape of the reference vertebra may be calculated using the boundary of the reference vertebra. This rectangle approximation (e.g., the example rectangle approximation 208) is communicated to a mask region analyzer 104 and a vertebra identifier 106. As described in detail below in connection with FIG. 3, the example mask region analyzer 104 uses the rectangle approximation (e.g., the example rectangle approximation 208) of the reference vertebra to identify regions (e.g., mask regions) in a mask of the spine image with similar pixel intensities as the reference vertebra. These identified mask regions are used to identify mask regions in the spine image. For example, two adjacent pixels with similar pixel intensities are identified (e.g., labeled) as a mask region. In some examples, the example mask region analyzer 104 records the labeled mask regions in an example storage device 108.

The example vertebra identifier 106 uses the rectangle approximation (e.g., the example rectangle approximation 208) of the reference vertebra received from the example rectangle approximator 102 and the mask regions identified by the example mask region analyzer 104 to identify mask regions in the mask with a similar shape as the reference vertebra. The example vertebra identifier 106 compares the shape of the reference vertebra to the shape of each mask region received from the example mask region analyzer 104 and/or the example storage device 108. The mask regions most similar in shape to the reference vertebra are identified as vertebrae and their boundaries are identified accordingly. In some examples, the example vertebra identifier 106 stores the detected vertebrae boundaries in the example storage device 108.

Figure 3:
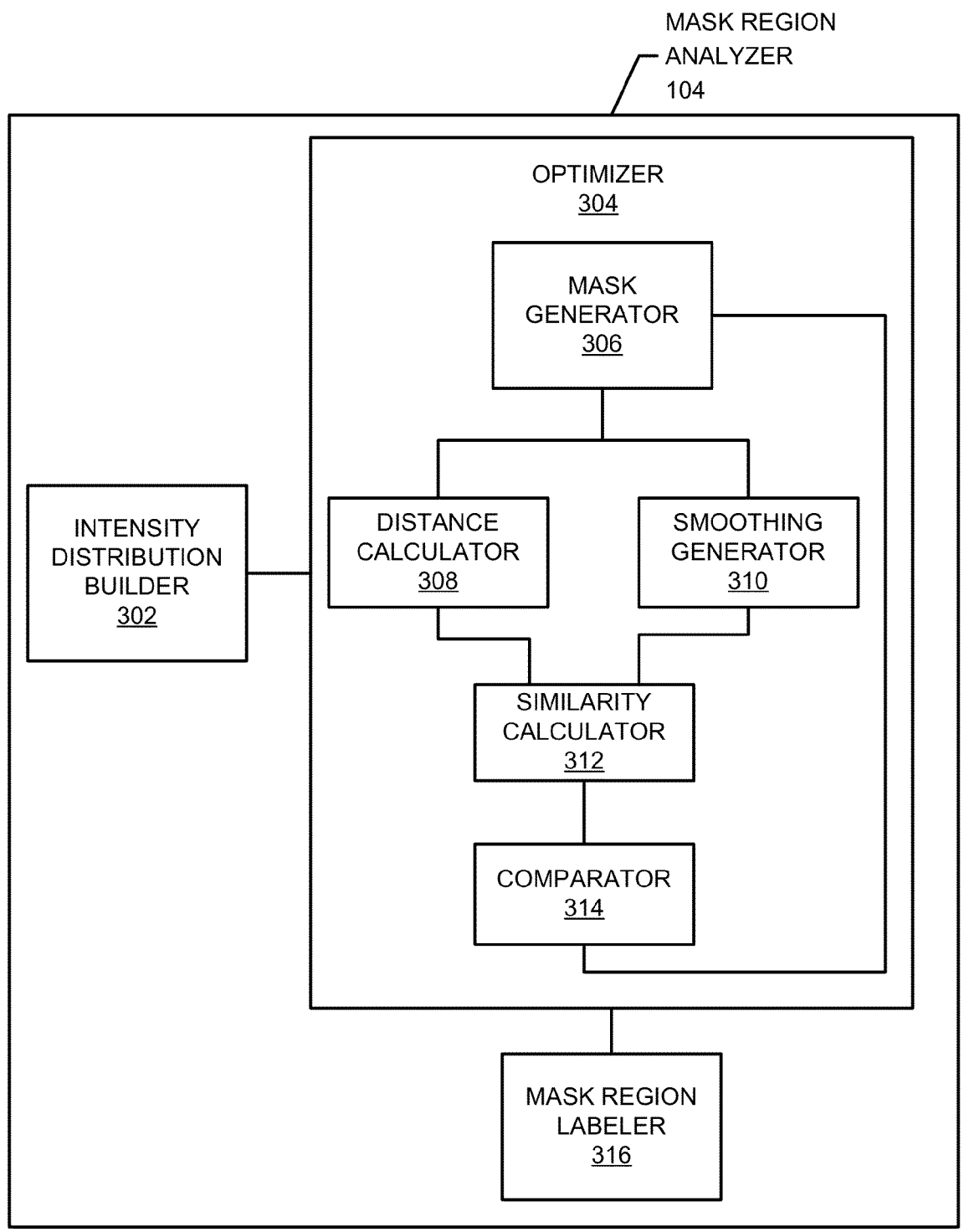
FIG. 3 is a block diagram of an example implemented of the example mask region analyzer of FIG. 1.

FIG. 3 illustrates an example implementation of the example mask region analyzer 104 of FIG. 1. The example mask region analyzer 104 identifies a mask similar to the rectangle approximation of the reference vertebra received from the example rectangle approximator 102 based on image intensity. In the illustrated example, a mask (e.g., a binary mask) describes the ON/OFF status of each pixel in the image. For example, in a 3×3 pixel image, a first mask may include all 9 pixels in the ON status. A second mask may include the first pixel in the first row in an OFF status and the remaining pixels in the ON status. In some examples, the mask may be described by a matrix. Identifying the mask similar to the rectangle approximation based on image intensity allows mask regions within the spine image to be identified. These mask regions are then analyzed by the example vertebra identifier 106 to find a mask region(s) similar to the reference vertebra in shape.

In the illustrated example of FIG. 3, the mask region analyzer 104 receives the rectangle approximation (e.g., the example rectangle approximation 208 of FIG. 2) of the reference vertebra from the rectangle approximator 102 and builds a statistical distribution model based on the image intensity. For example, the intensity distribution builder 302 builds a statistical distribution model using the pixel intensity values inside the rectangle approximation. In the illustrated example of FIG. 3, the intensity distribution model describing the rectangle approximation 208 is a probability density function (e.g., kernel density estimation).

As an illustrative example, the intensity distribution model of the rectangle approximation 208 (M) is a vector of size J, where J is the number of bins (e.g., J=255) for intensity values. The $j^{th}$ value of the intensity distribution model of the rectangle approximation 208 M is denoted M(j), j=1 . . . J, and is the probability of having an intensity value equal to j. However, other statistical distribution models may be used.

The intensity distribution model M built by the example intensity distribution builder 302 is compared to a mask generated by the example optimizer 304. The example optimizer 304 of FIG. 3 identifies the mask most similar to the rectangle approximation 208 based on the image intensity (e.g., the distribution of pixels). The example optimizer 304 calculates a similarity score including a Bhattacharyya distance and a smoothing factor. In the illustrated example, the Bhattacharyya distance describes the overlap between two distributions. For example, the Bhattacharyya distance describes the overlap between a distribution describing the rectangle approximation and a distribution describing the mask. The smoothing factor attempts to reduce noise in the mask. For example, the smoothing factor improves the similarity score of the mask by reducing (or eliminating) noisy data (e.g., small scale mask regions) in the mask. When the similarity score reaches a minimum value, the mask is identified as most similar to the rectangle approximation 208 of the reference vertebra. The example mask region labeler 316 receives the output from the example optimizer 304 a mask with regions (e.g., mask regions) of similar pixel intensities. The example mask region labeler 316 labels (e.g., identifies) mask regions in the mask that are used by the example vertebra identifier 106 of FIG. 1 to identify additional vertebrae boundaries in the spine image.

In the illustrated example of FIG. 3, the optimizer 304 includes a mask generator 306, a distance calculator 308, a smoothing generator 310, a similarity calculator 312 and a comparator 314. As described in detail below in connection with FIG. 4, the example mask generator 306 generates a new mask that will improve the similarity score of the current mask using the similarity score of the mask used in the previous iteration. For example, the mask generator 306 of FIG. 4 calculates whether changing the status of a pixel in the mask from ON to OFF will increase or decrease the similarity score (e.g., the Bhattacharyya measure of similarity between two distributions). The example mask generator 306 repeats this calculation for every pixel in the image until a new mask is calculated. This new mask is output to the example distance calculator 308 and the example smoothing generator 310 and used to calculate a similarity score of the mask and the rectangle approximation 208.

Figure 4:
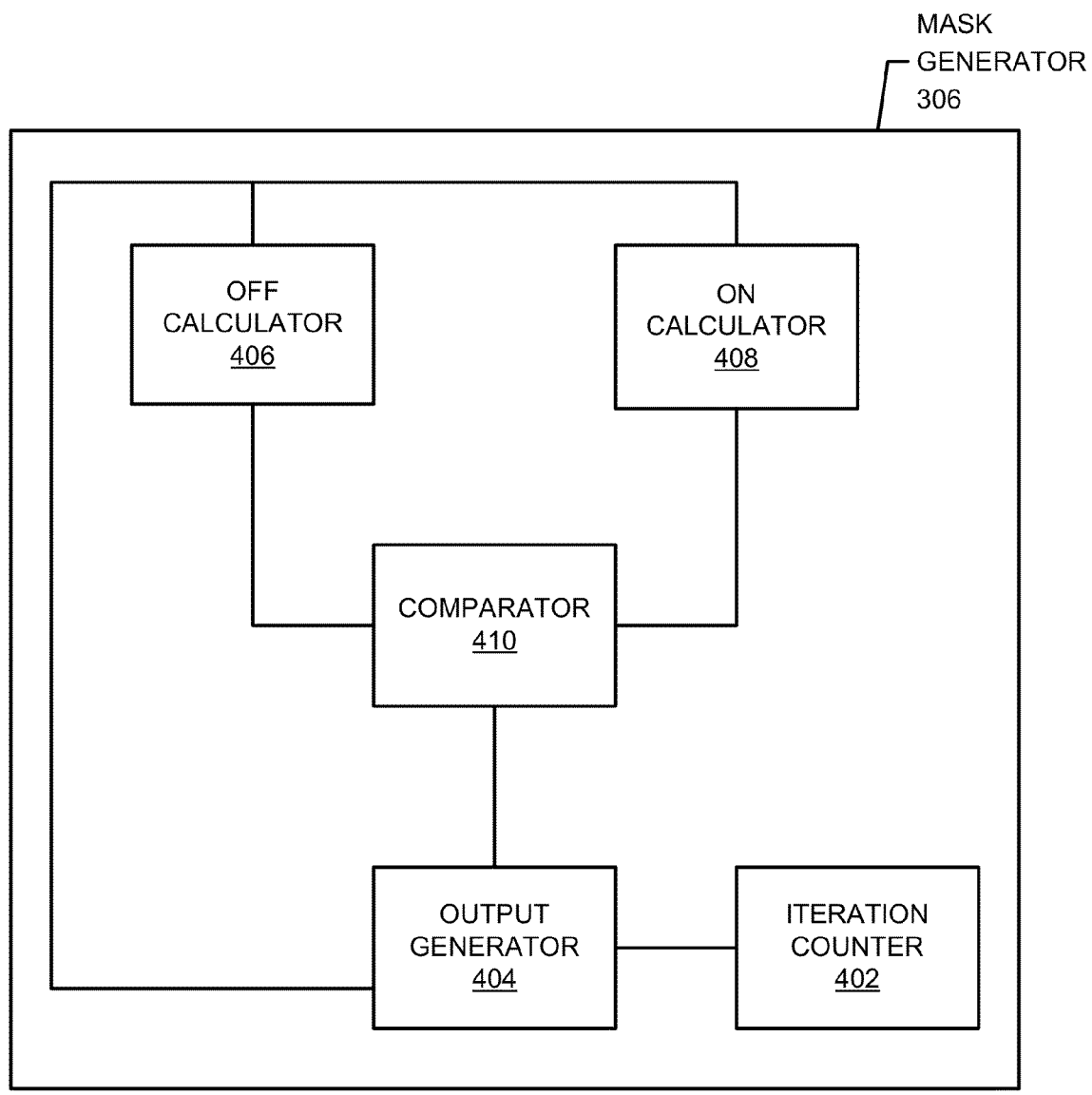
FIG. 4 is a block diagram of an example implementation of the example mask generator of FIG. 3.

FIG. 4 illustrates an example implementation of the example mask generator 306 of FIG. 3. The example mask generator 306 generates a mask that is compared with the intensity distribution model of the rectangle approximation 208 built by the example intensity distribution builder 302. As described below in connection to the example comparator 314 of FIG. 3, when the mask is not identified as the optimal mask (e.g., the mask most similar to the reference vertebrae in image intensity), the example mask generator 306 generates a new mask. Generating a new mask may include switching the status of one pixel (e.g., ON to OFF) or switching the status of any other number of pixels. Attempting to generate and compare every possible combination of ON and OFF status for each pixel is a time-consuming and inefficient method of identifying the optimal mask. Thus, the example mask generator 306 uses the previous iteration mask and calculates the impact switching a pixel has on a localized level before the overall mask is processed (e.g., compared to the image intensity of the rectangle approximation 208). As a result, a relatively faster comparison determining whether changing the status of a pixel increases the similarity score of the overall mask is performed and the status of the pixel stays the same or changes based on the comparison. In some examples, this comparison is performed on each pixel. Doing this comparison on a local level ensures the similarity score of each mask does not decrease.

In the illustrated example of FIG. 4, the mask generator 306 includes an iteration counter 402, an output generator 404, an OFF calculator 406, an ON calculator 408 and a comparator 410. The example iteration counter 402 identifies whether the example mask generator 306 has previously generated a mask. For example, when the mask generator 306 is initiated, the iteration counter 402 outputs to the example output generator 404 a negative indication (e.g., no, 0, false, etc.) indicating that no previous masks have been generated. As the example mask generator 306 uses the mask and similarity score of the previous iteration to generate a new mask, when a negative indication from the example iteration counter 402 is received, the example output generator 404 outputs a mask with all pixels in the ON status and a similarity score equal to zero (0). Alternatively, other pixel combinations are possible to use as an initial mask. As described above, the output from the example output generator 404 is received by the example distance calculator 308 and example smoothing generator 310 of FIG. 3 to calculate a similarity score between the masks and the intensity distribution model of the rectangle approximation 208.

On the other hand, when a previous iteration has already been calculated, the example iteration counter 402 outputs a positive indication (e.g., yes, 1, true, etc.) to the example output generator 404. The example output generator 404 outputs the mask calculated during the previous iteration to the example OFF calculator 406 and the example ON calculator 408. In the illustrated example of FIG. 4, the OFF calculator 406 calculates a scalar value $M_{p,I}(0)$ assuming the pixel is in the OFF status. In the illustrated example, the $M_{p,I}(0)$ function is calculating a value of the image intensity (M) of a pixel (p) in the image (I) with the pixel value set at zero (0). This scalar value includes, from the previous iteration, the Bhattacharyya score of the mask and the distribution of intensity corresponding to the image at that pixel. Similarly, a scalar value $M_{p,I}(1)$ assuming the pixel remains is in the ON status is calculated by the example ON calculator 408.

In the illustrated example, the comparator 410 compares the output from the OFF calculator 406 and the ON calculator 408 and determines whether the ON/OFF status of the pixel should be switched. In order to minimize the distance between the mask and the intensity distribution model of the rectangle approximation 208, the score at each pixel should be minimized. Thus, when the scalar value from the OFF calculator 406 (e.g., $M_{p,I}(0)$) is less than the scalar value calculated by the ON calculator 408 (e.g., $M_{p,I}(1)$), the pixel status is switched to OFF. Otherwise, the pixel status remains in the ON status. In the illustrated example, the example output generator 404 records the optimal pixel status (e.g., ON or OFF) of the pixel and similar calculations are performed for the remaining pixels in the image. Once the optimal pixel status of each pixel is determined, the example mask generator 306 outputs the new mask to the example distance calculator 308 and the example smoothing generator 310 to calculate a similarity score of the new mask and the rectangle approximation 208.

The example distance calculator 308 illustrated in FIG. 3 measures the amount of overlap (e.g., similarity) between two distributions. For example, the distance calculator 308 calculates the Bhattacharyya coefficient measuring the overlap between the distribution of pixel values within the mask output by the example mask generator 306 and the intensity distribution model of the rectangle approximation 208. The Bhattacharyya coefficient ranges from zero (0) to one (1) wherein a zero indicates that there is no overlap and a one indicates a perfect match between the distributions. The Bhattacharyya coefficient of the similarity score ensures the mask is consistent with the intensity distribution model of the rectangle approximation 208.

The example smoothing generator 310 generates a smoothing factor used in calculating the similarity score. In the illustrated example, the generated smoothing factor removes small and/or isolated labels due to imaging noise. As a result, the example smoothing generator 310 ensures label consistency of neighboring pixels. For example, the smoothing generator 310 receives a mask and reduces the noise in the mask by identifying irregular pixels. For example, a pixel in the ON status surrounded by pixels in the OFF status is likely the result of noise in the image data. Thus, the example smoothing generator 310 addresses the irregular pixel to improve the similarity score. The example similarity calculator 312 receives the Bhattacharyya coefficient from the example distance calculator 308 and the smoothing factor from the example smoothing generator 310 and calculates a similarity score. For example, the similarity calculator 312 adds the Bhattacharyya coefficient and the smoothing factor. As a result, the optimal similarity score of a mask is obtained when an optimal Bhattacharyya coefficient and an optimal smoothing factor are identified. For example, a mask with increased similarity (e.g., a low Bhattacharyya coefficient) but with increased noise may not be optimal compared to a mask with less similarity but with less noise.

The similarity score output by the example similarity calculator 312 is received by the example comparator 314. In the illustrated example of FIG. 3, the comparator 314 calculates the difference between the similarity score of the current mask and the similarity score of a previous mask (e.g., the mask analyzed during the previous iteration). In some examples, the comparator 314 stores the similarity score from the previous iteration in a local memory or register. When the difference between the two similarity scores is greater than a threshold, the example comparator 314 outputs an indication to generate a new mask. For example, when the difference between the similarity score of the current mask and the similarity score of the mask from the previous iteration is greater than $1*10^{-3}$ (0.001), the example comparator 314 outputs to the example mask generator 306 an indication to generate a new mask.

Figure 5:
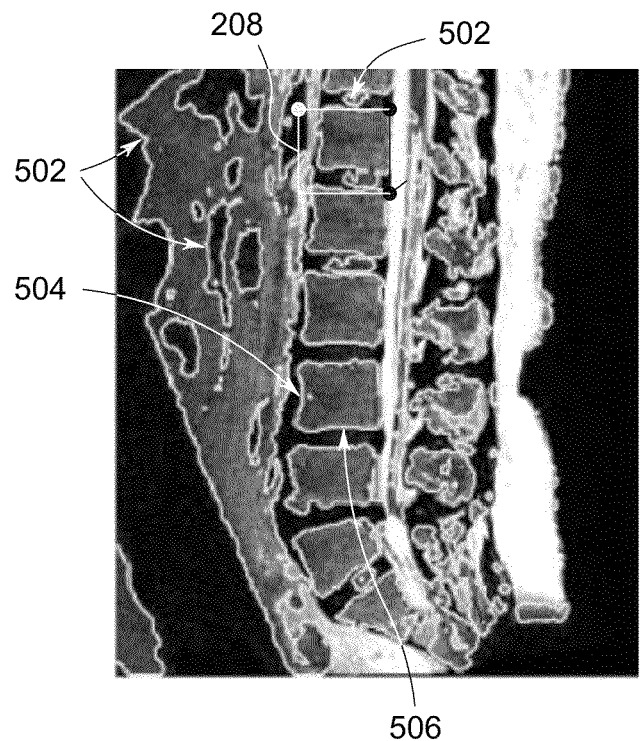
FIGS. 5 and 6 are another example image of a sagittal view of a spine.

On the other hand, when the difference is less than (or equal to) the threshold (0.001), the example comparator 314 determines the optimal mask (e.g., the mask most similar to the intensity distribution model of the rectangle approximation 208 based on the distribution of pixel values) is identified and the mask is further analyzed for mask regions. For example, when the difference between the similarity score received from the example similarity calculator 312 (e.g., the similarity score of the current mask) and the similarity score of the mask from the previous iteration is less than (or equal to) the threshold (0.001), the example comparator 314 outputs the mask to the example mask region labeler 316. A typical example of the result obtained by the example optimizer 304 is shown in FIG. 5. In the illustrated example of FIG. 5, portions of the image with similar image intensity to the reference vertebra are identified by the boundary 502. While a threshold of $1*10^{-3}$ is used in the example, other thresholds are also possible. Additionally and/or alternatively, the example comparator 314 may compare the similarity score of the current mask to a minimal value and determine the optimal mask is identified when the similarity score is greater than the threshold. In some examples, the optimal mask is identified when the similarity score is less than a threshold.

As the image intensity of the mask, which represents the entire spine image, is compared to the intensity distribution model of the rectangle approximation 208 of only the reference vertebra, irrelevant and/or non-vertebral regions within identified boundaries that have image intensities similar to the reference vertebra may be identified. For example, a region identified within another region is known as a hole. In the illustrated example of FIG. 5, the boundary of region 504 is within the boundary of region 506. Thus, while identifying boundaries within the spine image is helpful in identifying additional vertebrae, knowing only the boundaries is insufficient to do so.

Figure 6:
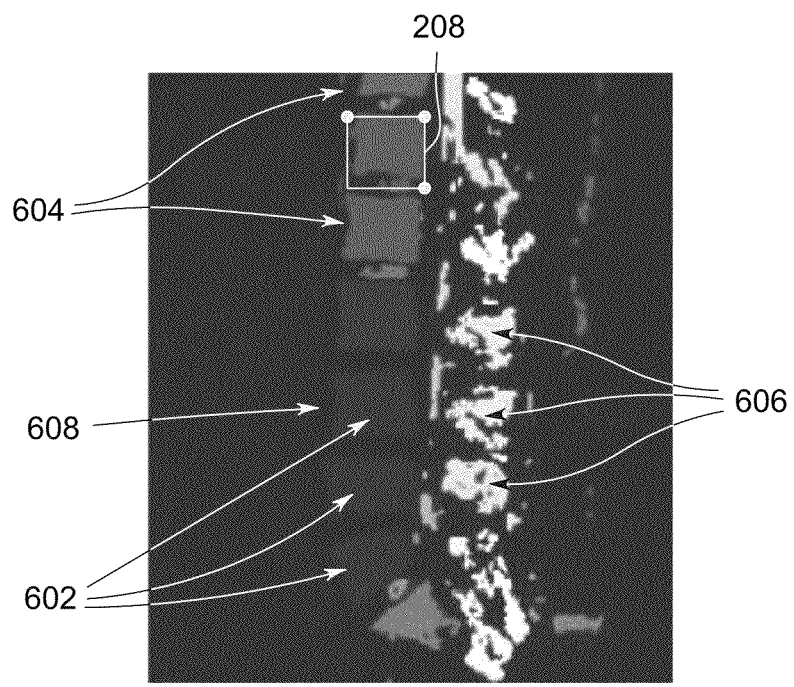

In the illustrated example of FIG. 3, the mask region labeler 316 receives the optimal mask from the example optimizer 304 and labels mask regions in the mask. For example, two adjacent pixels with similar pixel intensities are identified (e.g., labeled) as a mask region. In some examples, each label is identified by a different color. In the illustrated example of FIG. 6, similarly labeled mask regions are indicated through shades of gray. For example, mask regions labeled 602 are a different shade of gray than mask regions labeled 604 and mask regions labeled 606. As it is known that vertebrae do not contain holes (e.g., hole 504 in FIG. 5), the example mask region labeler 316 also removes holes in the mask. For example, there is no mask region in FIG. 6 labeled within the mask region identified by boundary 506 (shown by the arrow 608). Removing holes addresses the problem of noise and intensity inhomogeneity within the vertebrae regions. Identifying mask regions within a binary mask and removing holes may be done based on standard image processing techniques. Therefore, it is not explained in greater detailed here. In the illustrated example of FIG. 3, the example mask region labeler 316 of FIG. 3 stores information regarding the identified mask regions in a local memory, a register and/or a storage device such as the example storage device 108 of FIG. 1. For example, the boundary coordinates of each mask region may be stored.

Figure 7:
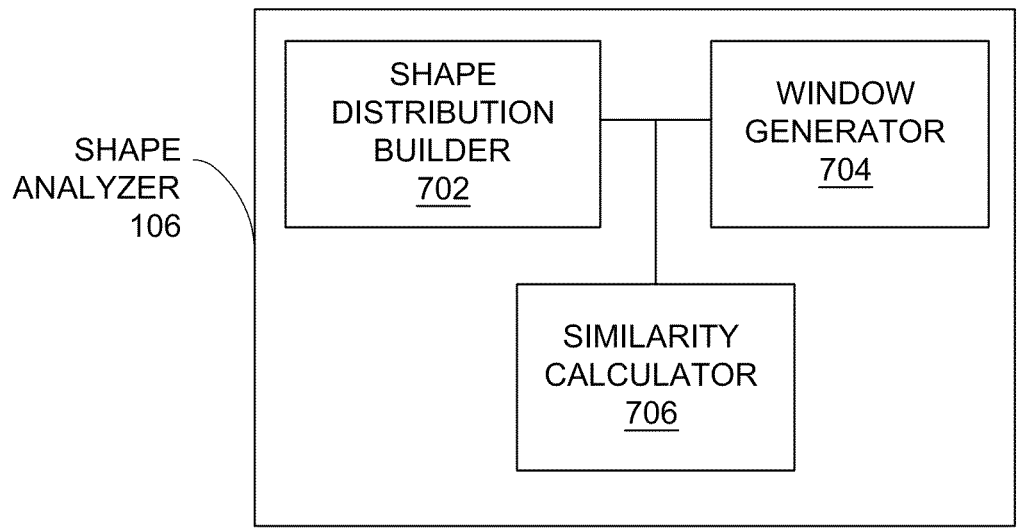
FIG. 7 is a block diagram of an example implementation of the example shape analyzer of FIG. 1.

FIG. 7 illustrates an example implementation of the example shape analyzer 106 of FIG. 1. In the illustrated example of FIG. 7, the shape analyzer 106 analyzes the shape of labeled mask regions to determine whether a mask region is a vertebra. As described above, the example shape analyzer 106 of FIG. 7 receives a rectangle approximation (e.g., the example rectangle approximation 208 of FIG. 2) of the reference vertebra from the example rectangle approximator 102. Using the boundaries of the rectangle approximation, the example shape analyzer 106 builds a statistical distribution model describing the shape of the rectangle approximation. As described below in connection with the example window generator 704, the example shape analyzer 106 generates a "sliding" window that limits the number of mask regions analyzed. Using known anatomical information about the overall shape of the spine as well as the shape of individual vertebrae, the shape analyzer 106 traverses the spine image from top to bottom. By doing so, a large set of irrelevant mask regions in the image are removed from analysis. The example shape analyzer 106 also receives information regarding mask regions labeled in the spine image by the example mask region analyzer 104. For example, the shape analyzer 106 receives information describing the location of each mask region and/or information describing the boundary of each mask region located within the window. Information regarding the boundary of each mask region is used by the example shape analyzer 106 to build a statistical distribution model describing the shape of each labeled mask region. Based on the results of a comparison of the statistical distribution models of the rectangle approximation and the mask regions, a determination is made regarding whether the mask region is a vertebra.

In the illustrated example of FIG. 7, the shape analyzer 106 includes a shape distribution builder 702, a window generator 704 and a similarity calculator 706. As described above, the example shape analyzer 106 receives a rectangle approximation (e.g., the example rectangle approximation 208) of the reference vertebra from the example rectangle approximator 102. The example shape distribution builder 702 of the illustrated example builds a statistical distribution model describing the rectangle approximation. For example, the shape distribution builder 702 builds a statistical distribution model describing the rectangle approximation 208 using the distances between the centroid of the rectangle approximation 208 and all the pixels located on the boundary of the rectangle approximation 208. In some examples, the centroid of the rectangle approximation is located at the mid-point of the length and width of the rectangle approximation. Knowing the centroid and the boundary of the rectangle approximation 208, the example shape distribution builder 702 calculates the distance between the centroid and each pixel on the boundary of the rectangle approximation 208. For example, the Euclidean distance between the centroid and each pixel on the boundary of the rectangle approximation may be calculated. Similar to the example intensity distribution builder 302 described in connection with FIG. 3, the example shape distribution builder 702 builds a probability density function describing the shape of the rectangle approximation based on the calculated distances. However, the use of other statistical distribution models is also possible.

The example window generator 704 of the illustrated FIG. 7 generates a window in which all of the mask regions within that window are compared to the rectangle approximation 208 based on the similarity of shapes. When the example window generator 704 receives an indication to generate a window, the example window generator 704 determines whether the bottom of the spine image was reached. The bottom of the spine image may be detected by, for example, determining whether the previous window overlapped with the bottom of the spine image based on the known dimensions of the spine image. If the previous window is at the bottom of the screen image, the example window generator 704 stops generating windows. When the window is not at the bottom of the spine image, the example window generator 704 generates a new window and "slides" the window downward relative to the previous window based on the location of the previously identified vertebra. Sliding the window downward based on the previously identified vertebra is valid because of the known anatomical information regarding the shape of the spine. Thus, mask regions located outside the path of the sliding window are known not to be vertebrae and do not need to be analyzed, which saves processing power and improves the time needed to automatically detect the vertebrae in the spine image.

The example window generator 704 determines a rectangle approximation of the previously detected vertebra and calculates a rectangular window using the previously detected vertebra. In the instance of the first window generation, when no vertebrae have been previously detected, the example window generator 704 uses the rectangle approximation 208 of the reference vertebra as a starting point to generate the window.

Figure 8:
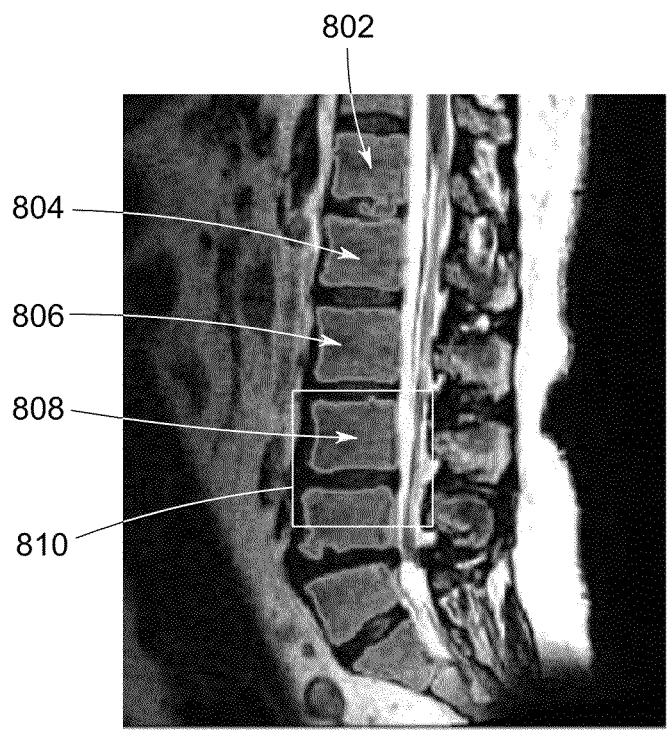
FIG. 8 is another example image of a sagittal view of a spine.

FIG. 8 illustrates an example output generated during the third window generation iteration. In the illustrated example of FIG. 8, vertebra 802 is the reference vertebra, vertebrae 804 and 806 have been previously detected (e.g., identified) and a mask region 808 is within a window 810. To generate window 810, the example window generator 704 uses the previously detected vertebra (e.g., vertebra 806) as a starting point to generate the window. In the illustrated example, the upper (horizontal) line segment of window 810 is parallel to the lower (horizontal) line segment of a rectangle approximation of the previously identified vertebra (vertebra 806). The mid-point (e.g., centroid) of the upper line segment of window 810 coincides exactly with the centroid of the lower line segment of the rectangle approximation of vertebra 806. The length of the upper line segment of window 810 is calculated by multiplying the length of the lower line segment of the rectangle approximation of vertebra 806 and a multiplier. In the illustrated example, the multiplier is equal to two (2). The example window generator 704 generates the side (vertical) line segments of window 810 by multiplying the width of the previously detected vertebra (vertebra 806) by the same multiplier (2). Thus, in the illustrated example, the window generator 704 generates a window 810 with four (4) times the area of vertebra 806. However, generating a window using other multipliers and dimensions of the previously detected vertebra are also possible. For example, the example window generator 704 may generate the side (vertical) lines segments of a window and the lower (horizontal) line segment of the window with the same length as the upper line segment of window. As a result, the example window generator 704 generates a square window.

Once the window 810 is generated, the example shape distribution builder 702 receives the boundary information for each mask region within the window. In some examples, the boundary information is stored in a storage device such as the example storage device 108 of FIG. 1. Additionally and/or alternatively, the boundary information may be stored in a local memory or register of, for example, the example mask region labeler 316 of FIG. 3. In the illustrated example of FIG. 8, the shape distribution builder 702 receives the boundary information corresponding to the mask region 808. Using the boundary information of the mask region 808, the example shape distribution builder 702 builds a statistical distribution model (e.g., a probability density function) describing the shape of the mask region 808. In the illustrated example, the shape distribution builder 702 builds a shape distribution model describing each mask region within the window generated by the example window generator 704.

In the illustrated example of FIG. 7, the example similarity calculator 706 receives the shape distribution model describing the reference vertebra and the shape distribution model describing the mask region 808. As described above in connection with the example distance calculator B3 of FIG. 3, the example similarity calculator 706 of FIG. 7 measures the amount of overlap (e.g., similarity) between the two distributions. For example, the similarity calculator 706 calculates the Bhattacharyya coefficient measuring the overlap between the distributions of distances of the two received distributions. The example similarity calculator 706 repeats this calculation until a Bhattacharyya coefficient measuring the similarity of each mask region within the window and the reference vertebra is calculated. The example similarity calculator 706 detects (e.g., identifies) a new vertebra in the window based on the highest Bhattacharyya coefficient. In some examples, the similarity calculator 706 records the boundary information of the new vertebra in a local memory, a register and/or a storage device (e.g., the example storage device 108 of FIG. 1). The example similarity calculator 706 indicates to the example window generator 704 to generate a new window when the new vertebra is detected. In some examples, the similarity calculator 706 annotates labels (or text) corresponding to the detected vertebrae boundaries.

Figure 9:
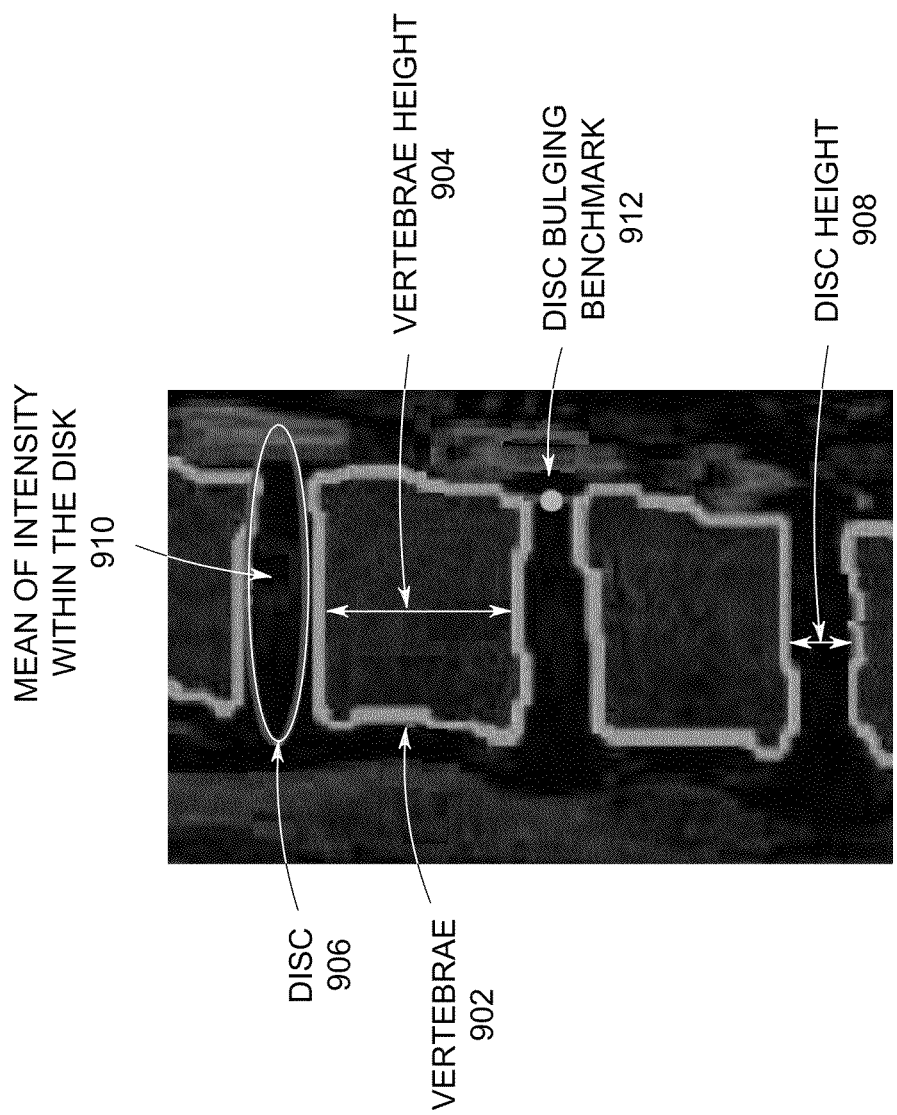
FIG. 9 is a blown-up image of a sagittal view of a spine.

As described above, knowing the vertebrae boundaries allows straightforward calculations of measures and/or benchmarks useful in computer-aided diagnosis. FIG. 9 illustrates example measurements and benchmarks which may be determined based on the vertebrae boundaries 902 and subsequently detected inter-vertebral discs 906. For example, once the vertebrae boundaries 902 are obtained, the vertebrae dimensions, including vertebrae heights 904 and areas may be calculated. Disc dimensions, including disc heights 908 and areas, and disc intensity statistics, including the mean of intensity values within a disc 910, may also be found. Another example includes identifying benchmark points for disc bulging, including the center of the segment joining corners of two neighboring vertebrae 912.

Figure 10:
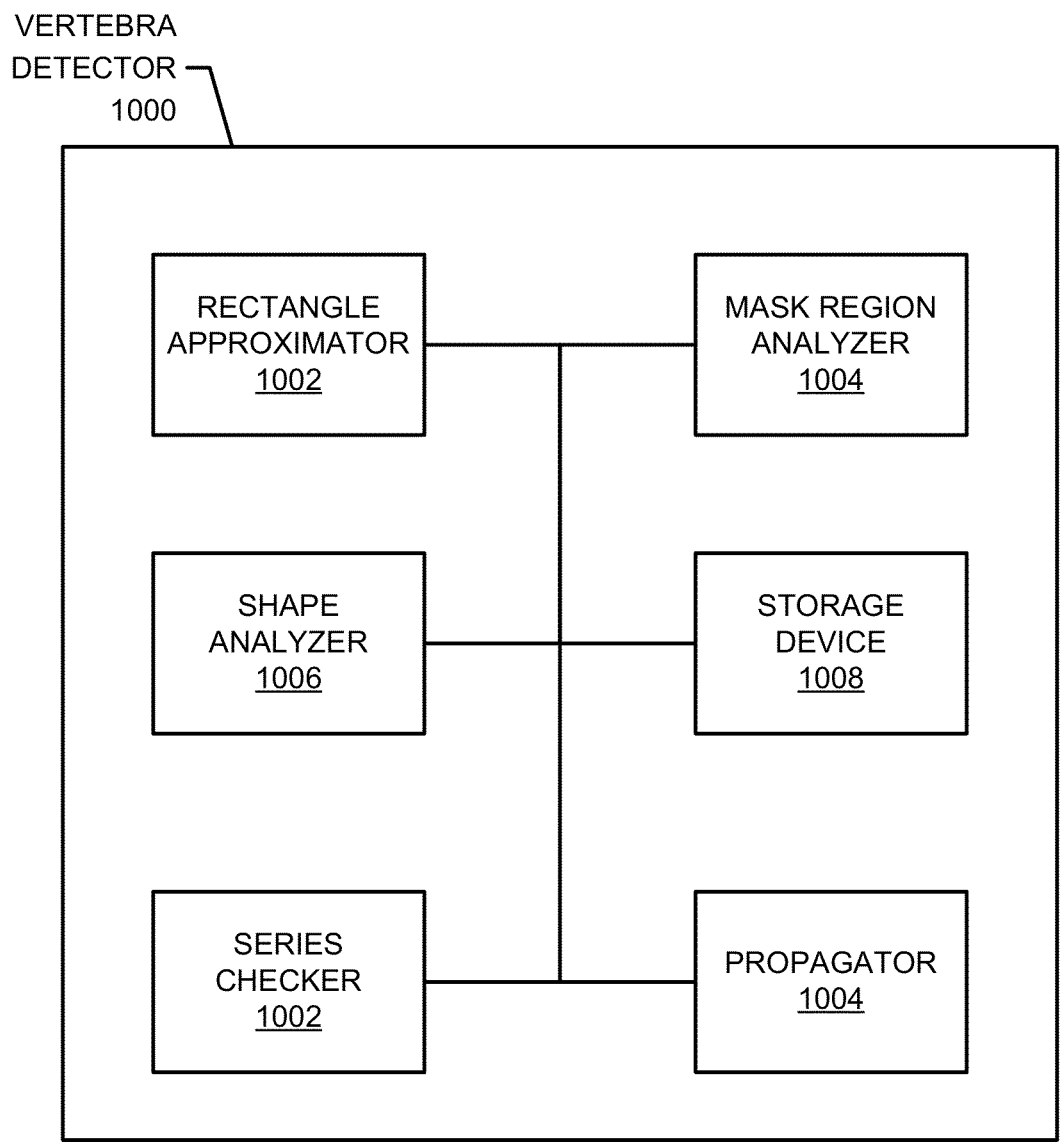
FIG. 10 is a block diagram of a second example implementation of a vertebra detector.

FIG. 10 illustrates a second example implementation of the example vertebra detector 100 of FIG. 1. As described above in connection with the example vertebra detector 100 of FIG. 1, the example vertebra detector 1000 is used to automatically detect vertebrae boundaries in a spine image with minimal user input. In addition to the functionality described above in connection with the example vertebra detector 100 of FIG. 1, the example vertebra detector 1000 of FIG. 10 automatically propagates the identified vertebrae boundaries in the spine image to other images (e.g., slices) in a series of images of the same subject (e.g., patient). For example, the number of images in spine studies may be larger than 100 images. In some such examples, labeling all of these images using the standard approach of manually labeling each boundary, label and/or text annotation is prohibitively time-consuming. The example vertebrae detector 1000 of FIG. 10 automates propagating the boundaries of the vertebrae throughout all the images in the series. However, automating propagation of labels and/or text annotations of any anatomical landmarks of the spine (e.g., disc centroids) is also possible. For example, in addition to selecting the three user points used to approximate the reference rectangle (e.g., rectangle approximation 208 of FIG. 2), the healthcare practitioner may also select additional anatomical landmarks in the reference spine image. Alternatively, the healthcare practitioner may select additional anatomical landmarks in the reference spine image after the vertebrae boundaries are detected.

The example vertebra detector 1000 includes an example rectangle approximator 1002, an example mask region analyzer 1004 and an example vertebra identifier 1006 that function similarly to the counterpart components of the example vertebra detector 100 of FIG. 1 Additionally, the example vertebra detector 1000 includes an example storage device 1008. Because of the similarity of the like numbered components, those components from FIG. 1 are not re-described here. A complete description of the system 100 is provided above. To propagate the vertebrae boundaries detected in the reference spine image throughout the other images in the series, the example vertebra detector 1000 includes a series checker 1010 and a propagator 1012.

The example series checker 1010 receives an image and determines whether that image is part of a series. For example, the series checker 1010 checks metadata appended to the image to determine whether the image is part of a series of images. When the image is not part of a series, the example series checker 1010 resets a flag (e.g., flag=0) in the example shape analyzer 1006. On the other hand, when the image is part of a series of images, the example series checker 1010 sets the flag (e.g., flag=1) in the example shape analyzer 1006 and indicates to the example propagator 1012 an image included in a series is being processed.

While the following example methods and systems are described in connection to vertebrae landmarks identified in a spine image, the example methods and systems may be used with any landmarks identified in an image. For example, landmarks may be identified (automatically or by a healthcare provider) on a heart image to describe myocardial motion. For instance, tracking landmarks through a series of images may identify regional mall motion abnormalities of the left ventricle. This information may be used to better diagnose coronary heart disease, for example.

As described in further detail below in connection with FIG. 11, the example propagator 1012 receives the vertebrae boundaries from the example storage device 1008 and captures pixel coordinates of the reference vertebrae in the reference spine image. For example, the propagator 1012 identifies the pixel coordinates corresponding to a corner of each of the reference vertebrae. Additionally and/or alternatively, the example propagator 1012 may identify the pixel coordinates of the respective boundaries of each reference vertebrae. In the illustrated example of FIG. 10, the propagator 1012 identifies the displacement for each pixel in every image in the series with respect to a neighboring image in the series. The example propagator 1012 builds a displacement matrix (e.g., a spatial mapping) between a reference image and any other image in the series (e.g., a target image) by computing a point-to-point mapping between two neighboring (e.g., consecutive) images in the series. For any image i in the series, the example propagator 1012 retrieves the displacement from the displacement matrix and the new vertebrae boundaries of image i are displayed.

Figure 11:
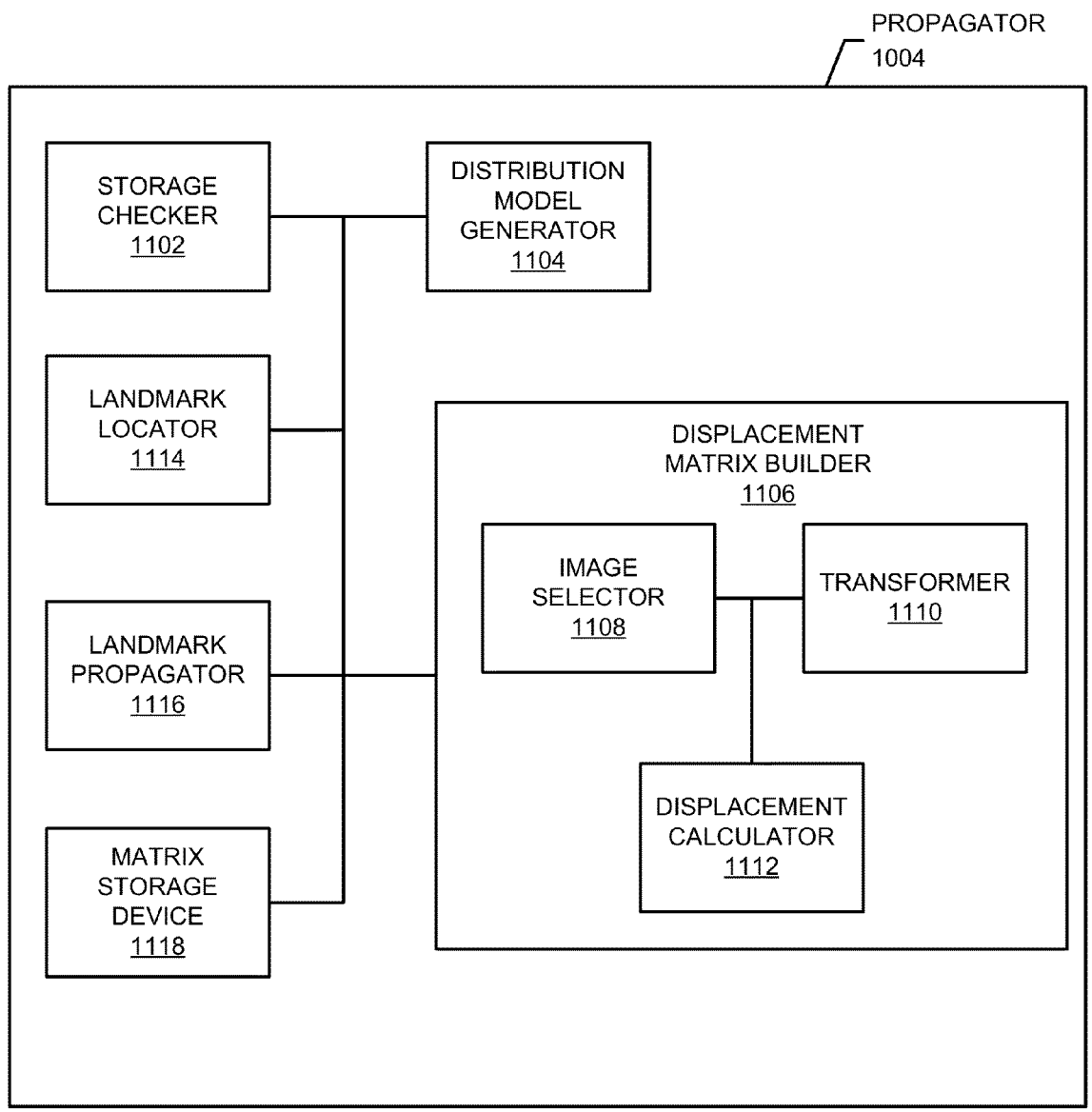
FIG. 11 is a block diagram of an example implementation of the example propagator of FIG. 10.

FIG. 11 illustrates an example implementation of the example propagator 1012 of FIG. 10. The example propagator 1012 receives a series of images such as images of a patient taken at different moments in time. The example propagator 1012 generates a statistical distribution model describing each image and aligns two images. By doing so, the displacement between any two images in the series may be calculated. As described below in connection with the example displacement matrix builder 1106, the example propagator 1012 calculates the distance a reference image needs to be offset in the x-axis and/or the y-axis (using the Cartesian map) to align with a target image. The example propagator 1012 repeats this for every image in the series and generates a matrix to store the calculated displacement information. Thus, by providing input indicating the location of reference points on a reference image, the example propagator 1012 automatically identifies the location of the corresponding points in any image in the series. This is helpful, for example, when a healthcare practitioner is reviewing a series of images taken of the same subject over a period of time. For example, a series of sagittal images of the spine taken while the subject is breathing introduces movement of a reference point(s) in each image due to inhalation and exhalation. Thus, by being able to automatically locate and display the location of the reference point(s) in each image proves useful in reducing the time to identify the change in position of a reference point(s) through a series of images.

The example propagator 1012 of FIG. 11 includes an example storage checker 1102, an example distribution model generator 1104, an example displacement matrix builder 1106, an example landmark locator 1114, an example landmark propagator 1116 and an example matrix storage device 1118. When the example propagator 1012 is initiated, the example storage checker 1102 determines whether the series of images has been preprocessed and is stored in a storage device such as the example matrix storage device 1118. If the series of images is stored in the storage device, the example storage checker 1102 receives the preprocessed information regarding the images. For example, the example storage checker 1102 receives statistical distribution models describing each image in the series from the example matrix storage device 1118.

On the other hand, when the series of images is not stored in the storage device, the example storage checker 1102 indicates to the example distribution model generator 1104 to generate statistical distribution models of the images. The example distribution model generator 1104 generates a statistical distribution model based on image intensity similar to the example intensity distribution builder 302 of FIG. 3. That is, the example distribution model generator 1104 builds a probability density estimation, such as a kernel density estimation, describing the image based on the intensity (e.g., the pixel distribution) of the image. The example distribution model generator 1104 repeats this process for each image in the series and stores the information (e.g., statistical distribution model information) in a storage device, such as the example matrix storage device 1118.

The example displacement matrix builder 1106 receives the generated statistical distribution models of the images and calculates the distance (e.g., displacement) between corresponding points in the images. This information is used by the example landmark propagator 1116 to determine and display the location of a reference point in a selected image (e.g., a target image) in the series.

In the illustrated example of FIG. 11, the displacement matrix builder 1106 includes an image selector 1108, a transformer 1110 and a displacement calculator 1112. When the example displacement matrix builder 1106 receives the statistical distribution model information generated by the example distribution model generator 1104, the example image selector 1108 determines the number of images in the series and selects the middle image as the reference image. For example, if a series of images includes 12 slices, slice 6 is set as the reference image by the example image selector 1108. The example image selector 1108 selects a first neighboring image from the reference image (e.g., slice 5) and a second neighboring image from the reference image (e.g., slice 7) as first and second target images, respectively. The example transformer 1110 uses the statistical distribution model information to align the reference image (slice 6) with the first target image (slice 5). The example transformer 1110 also aligns the reference image (slice 6) with the second target image (slice 7). The example transformer 1110 of FIG. 11 continues to transform the reference image and the target image until the maximum similarity is found. For example, the transformer 1110 may use a Jacobian transformation to maximize the correlation between the reference image aligned with the target image. By doing so, the example transformer 1110 generates a point-to-point mapping between every point on the reference image to the points on the target image. In the illustrated example of FIG. 11, each "point" is a pixel. However, the use of other points, for example, locations of interest points and/or geometrical features (e.g., line segments, curves, etc.), is also possible.

Figure 12:
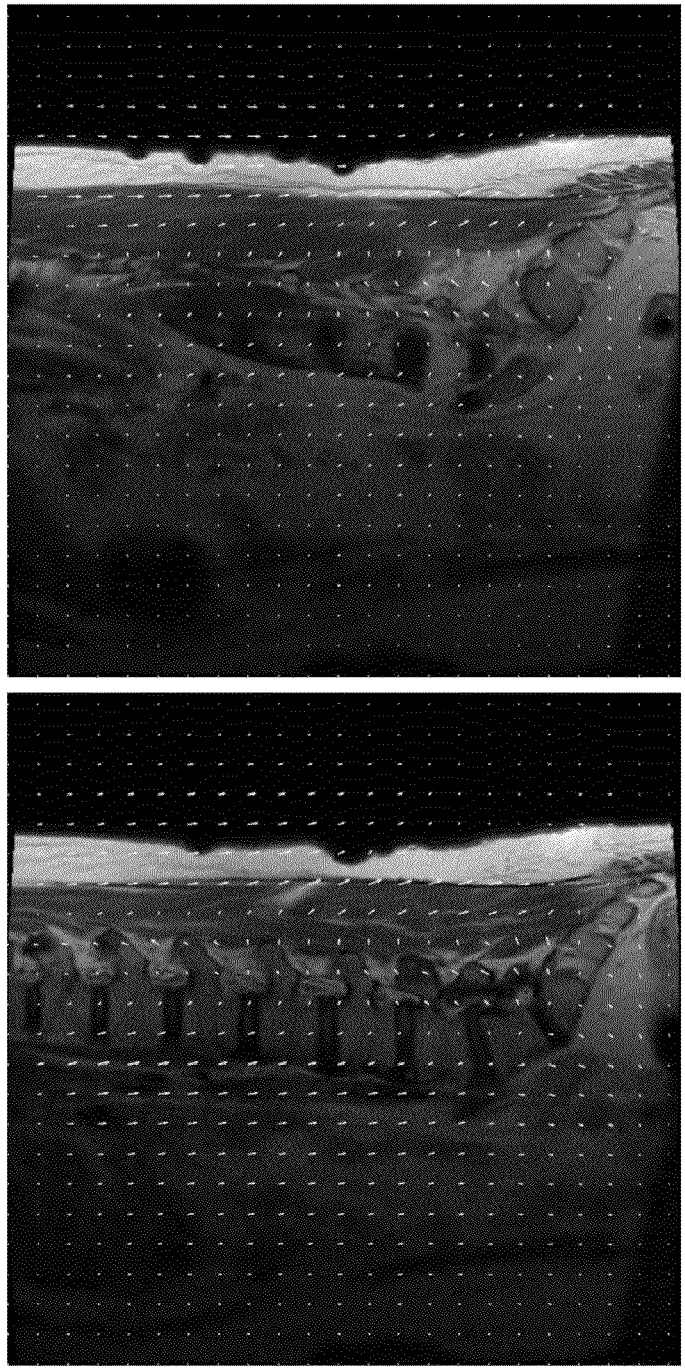
FIGS. 12-14 are another example image of a sagittal view of a spine.

Using the point-to-point mapping, the example displacement calculator 1112 calculates the displacement (e.g., offset) between a pixel in the reference image and the target image. For example, referring to the lower left corner of the image as the origin in a Cartesian map, the pixel coordinates (x, y) may be used to represent the location of a pixel in the reference image. The example displacement calculator 1112 uses the point-to-point mapping generated by the example transformer 1110 to calculate the displacement between the pixel coordinates of a pixel in the reference image and the pixel coordinates of the corresponding pixel in the target image. That is to say, when a pixel located at (x, y) in the reference image and the corresponding pixel in the target image is at the pixel coordinates (x+dx, y+dy), the displacement between the pixel coordinates is represented as (dx, dy). In the illustrated example of FIG. 11, the displacement calculator 1112 calculates the displacement between every pixel in the reference image to the target image, and stores the displacement in a storage device, such as the example matrix storage device 1118. The example matrix storage device 1118 stores the displacements in a matrix from which the displacement information may be recalled. FIG. 12 is an example image generated by the example displacement matrix builder 1106 when the displacements are stored as displacement vectors in the matrix stored in the example matrix storage device 1118. Slice 8 of FIG. 12 displays an output of the displacement vectors when transforming from slice 7 to slice 8 (or vice versa). Similarly, slice 12 of FIG. 12 displays an output of the displacement vectors stored in the example matrix storage device 1118 when transforming from slice 11 to slice 12 (or vice versa). For example, a healthcare practitioner may look at the output displacement vectors over the series of images to determine which areas of the image changed more than other areas in the image between two consecutive images. In some examples, the displacement calculator 1112 outputs to the example image selector 1108 to set the processed target image as the new reference image and to calculate a new target image. For example, the image selector 1108 sets slice 5 and slice 7 as the reference images and sets slice 4 and slice 8, respectively, as two new target slices.

As an illustrative example, the example displacement matrix builder 1106 may include non-rigid image registration. For example, rather than using a linear transformation to align the target image and the reference image, an elastic transformation using local warping to align the target image and the reference image is used. In the illustrated example of FIG. 11, a moving mesh generation algorithm including Jacobian transformations is included to build the displacement matrix.

The example landmark locator 1114 receives a landmark(s) (e.g., a reference point(s)) on a reference image, and that landmark(s) is propagated from the reference image throughout the series of images. In the illustrated example, the example landmark located 1114 receives the reference point automatically from the example storage device 1008 of FIG. 10. Additionally and/or alternatively, the example landmark locator 1114 may receive the landmarks via user input and/or a combination of automatic and manual user input. For example, the vertebrae boundaries stored in the example storage device 1008 by the example shape analyzer 1006 may be displayed to the user via a user interface (e.g., a monitor). The healthcare practitioner may then deselect a displayed vertebra boundary and/or select an additional landmark such as an inter-vertebral disc. The example landmark locator 1114 of FIG. 11 identifies the pixel coordinates of the landmark in the reference image. For example, using the Cartesian map with the origin in the lower left corner of the image, the landmark locator 1114 locates the pixel coordinates (x, y) of each identified landmark. In some examples, the landmark locater 1114 may record the pixel coordinates of each identified landmark in a local memory, a register and/or a storage device (e.g., the example storage device 1008 of FIG. 10).

The example landmark propagator 1116 receives a target image from the user and generates the pixel coordinates of the landmarks to display on the target image. For example, the user (e.g., a healthcare practitioner) decides to track the location of discs (e.g., inter-vertebral discs) in a spine image of a subject over a time period including 12 images. The example landmark propagator 1116 receives the pixel coordinates of each identified landmark in the reference image. For example, the landmark propagator 1116 receives the pixel coordinates from the example landmark locator 1114 and/or the example storage device 1008. The example landmark propagator 1116 also receives the displacement information of each pixel in the series of images. For example, the landmark propagator 1116 receives the displacement matrix from the example matrix storage device 1118. The example landmark propagator 1116 uses the pixel coordinates of each landmark from the reference image and the pixel displacement information to calculate the pixel coordinates of each landmark in each of the target images. For example, to calculate the pixel coordinates of a first landmark in slice 4 of the 12 slice series, the landmark propagator 1116 receives the pixel coordinates of the first landmark in slice 6(x, y), the displacement of the first landmark between slice 6 and slice 5 ($dx_{65}$, $dy_{65}$) and the displacement of the first landmark between slice 5 and slice 4 ($dx_{54}$, $dy_{54}$). The example landmark propagator 1116 then calculates the pixel coordinates of the first landmark on slice 4 (e.g., ($x+dx_{65}+dx_{54}$, $y+dy_{65}+dy_{54}$). This calculated pixel coordinate is displayed to the user.

Figure 13:
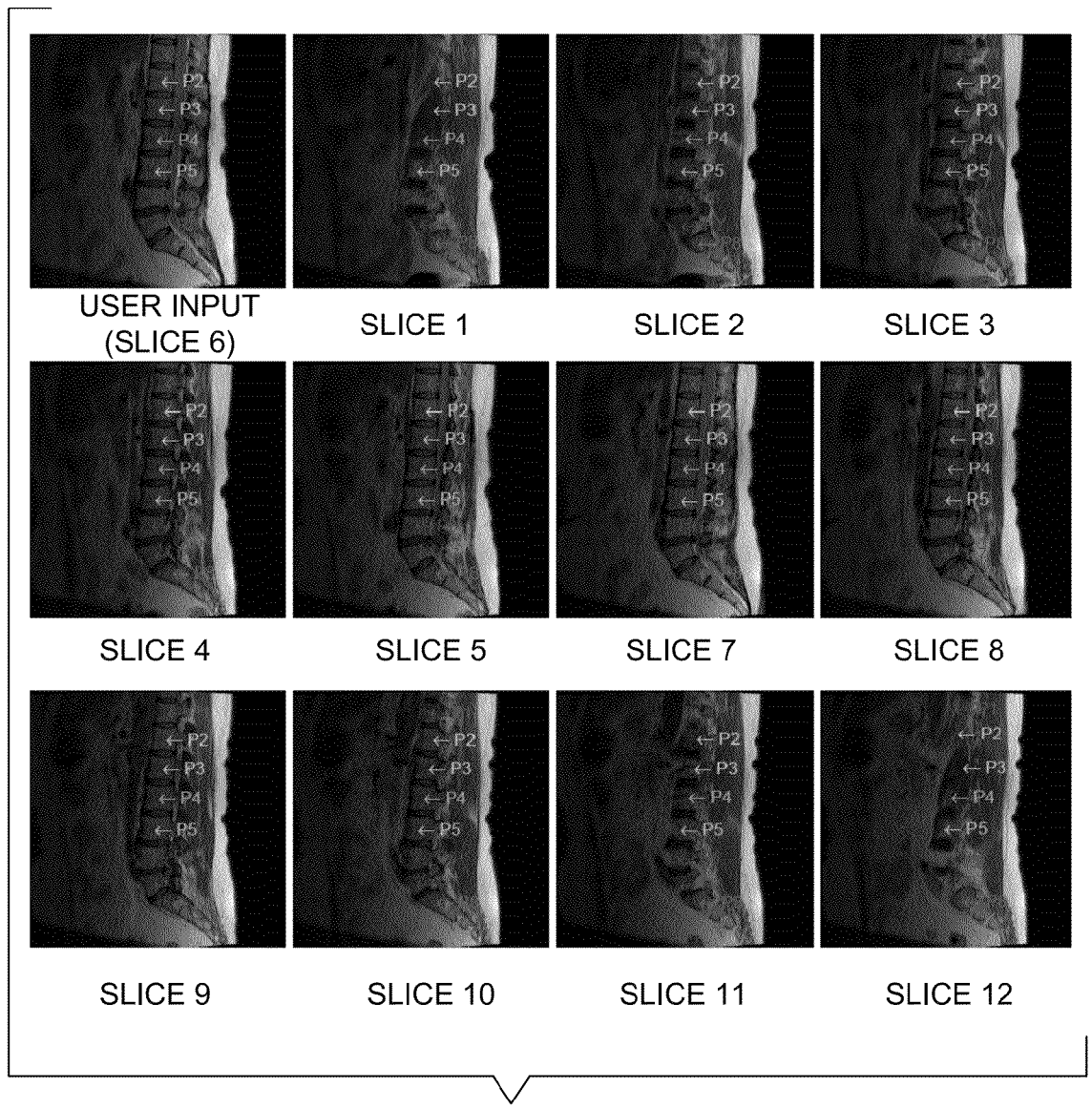
Figure 14:
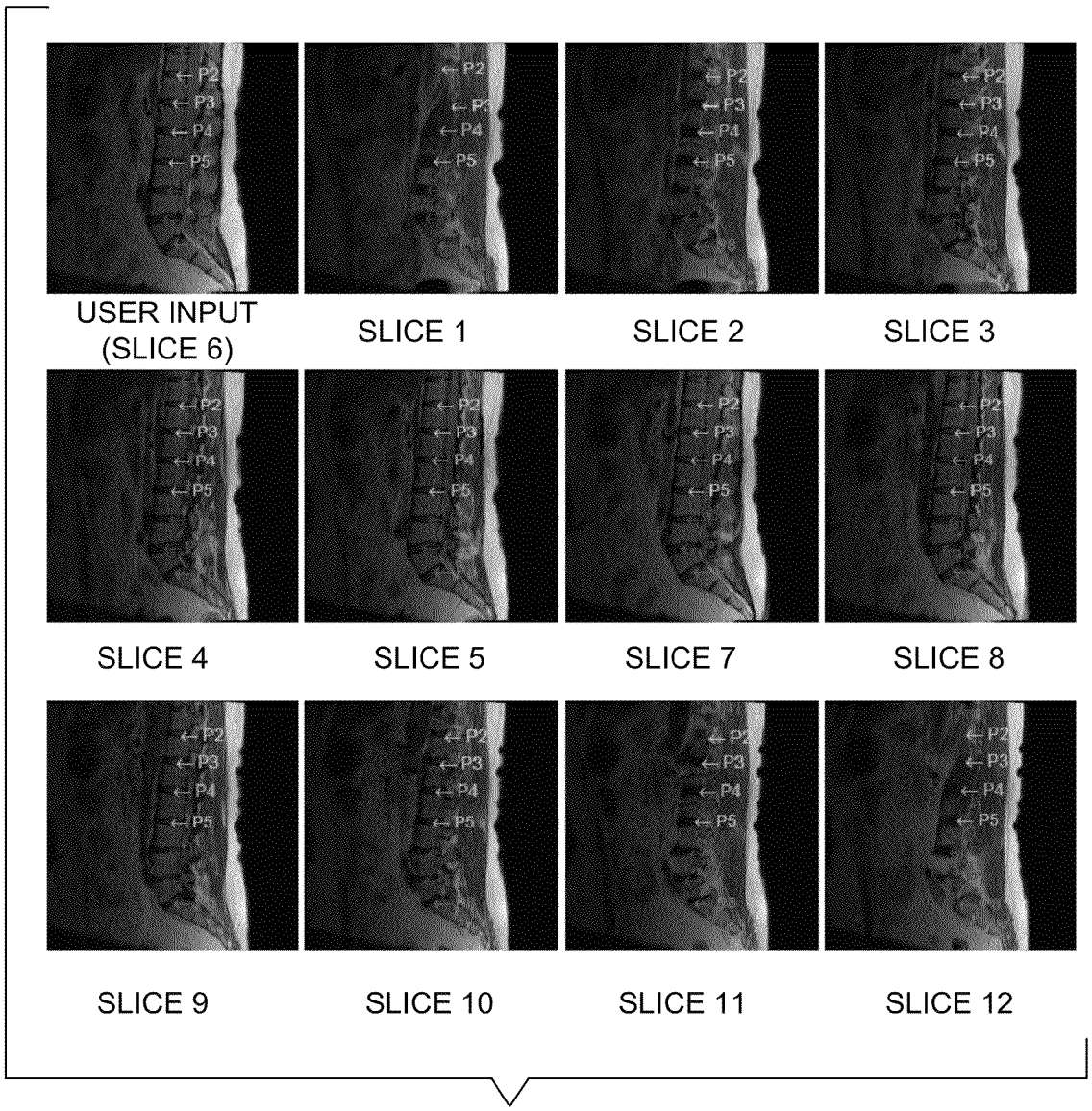

FIGS. 13 and 14 are two example image series output by the example propagator 1012. In the example output of FIG. 13, the user labeled the location of vertebrae in slice 6. The vertebrae locations were propagated from slice 1 to slice 12 by the example propagator 1012. In the example out of FIG. 14, the example propagator 1012 propagated the location of the labeled inter-vertebral discs in slice 6 from slice 1 to slice 12.

In the illustrated example of FIG. 11, the displacement matrix builder 1106 does not involve user input to build the displacement matrix. Thus, this process may be performed offline. For example, when the example propagator 1012 receives a series of images, the example propagator 1012 may automatically build the displacement matrix describing the displacement from one image to another image in the series and store the displacement matrix in a storage device to be used at a later time. As a result, the process of landmark propagation through a series of images may be more efficiently performed by recalling from the storage device the necessary displacements rather than calculating the displacements each time a user identifies a landmark.

While an example manner of implementing the vertebra detector 100 has been illustrated in FIGS. 1, 3, 4 and 7, one or more of the elements, processes and/or devices illustrated in FIGS. 1, 3, 4 and 7 may be combined, divided, re-arranged, omitted, eliminated and/or implemented in any other way. Further, the example rectangle approximator 102, the example mask region analyzer 104, the example vertebra identifier 106 and/or, more generally, the example vertebra detector 100 of FIGS. 1, 3, 4 and 7 may be implemented by hardware, software, firmware and/or any combination of hardware, software and/or firmware. Thus, for example, any of the example rectangle approximator 102, the example mask region analyzer 104, the example vertebra identifier 106 and/or, more generally, the example vertebra detector 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example rectangle approximator 102, the example mask region analyzer 104 and/or the example vertebra identifier 106 are hereby expressly defined to include a tangible computer readable medium such as a memory, DVD, CD, Blu-ray, etc. storing the software and/or firmware. Further still, the example vertebra detector 100 of FIGS. 1, 3, 4 and 7 may include one or more elements, processes and/or devices in addition to, or instead of, those illustrated in FIGS. 1, 3, 4 and 7, and/or may include more than one of any or all of the illustrated elements, processes and devices.

While an example manner of implementing the vertebra detector 1000 has been illustrated in FIGS. 10 and 11, one or more of the elements, processes and/or devices illustrated in FIGS. 10 and 11 may be combined, divided, re-arranged, omitted, eliminated and/or implemented in any other way. Further, the example rectangle approximator 1002, the example mask region analyzer 1004, the example shape analyzer 1006, the example series checker 1010, the example propagator 1012 and/or, more generally, the example vertebra detector 1000 of FIGS. 10 and 11 may be implemented by hardware, software, firmware and/or any combination of hardware, software and/or firmware. Thus, for example, any of the example rectangle approximator 1002, the example mask region analyzer 1004, the example vertebra identifier 1006, the example series checker 1010, the example propagator 1012 and/or, more generally, the example vertebra detector 1000 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example rectangle approximator 1002, the example mask region analyzer 1004, the example vertebra identifier 1006, the example series checker 1010 and/or the example propagator 1012 are hereby expressly defined to include a tangible computer readable medium such as a memory, DVD, CD, Blu-ray, etc. storing the software and/or firmware. Further still, the example vertebra detector 1000 of FIGS. 10 and 11 may include one or more elements, processes and/or devices in addition to, or instead of, those illustrated in FIGS. 10 and 11, and/or may include more than one of any or all of the illustrated elements, processes and devices.

Figure 15:
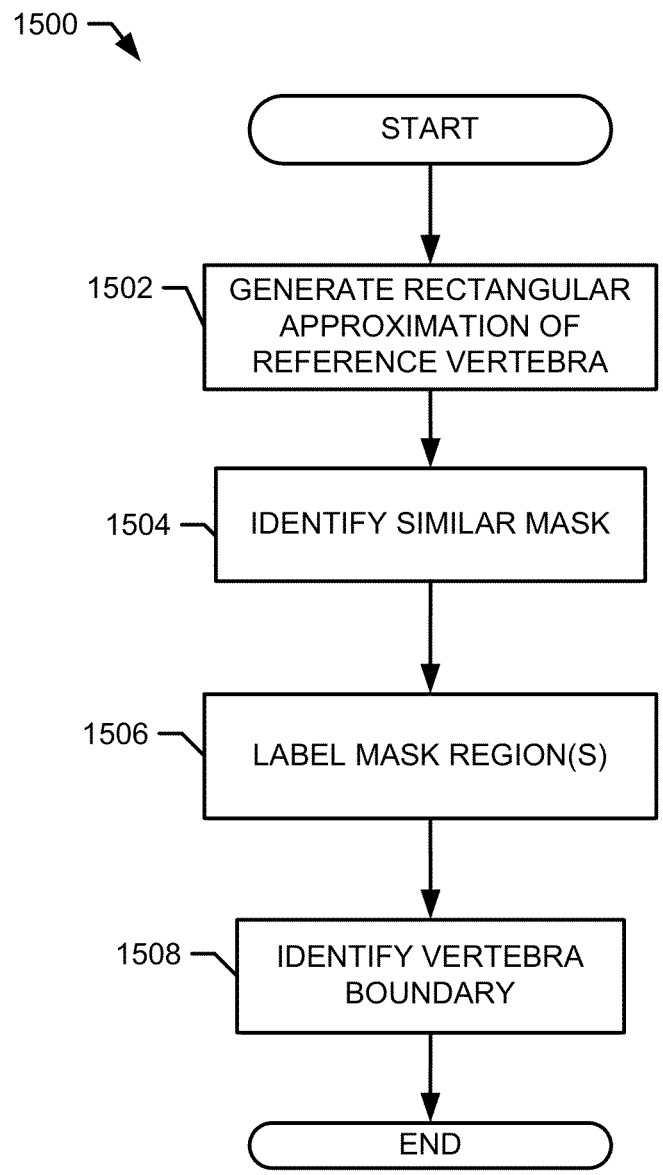
FIG. 15 is a flowchart representative of example machine readable instructions that may be executed to implement the example vertebra detector of FIG. 1.
Figure 16:
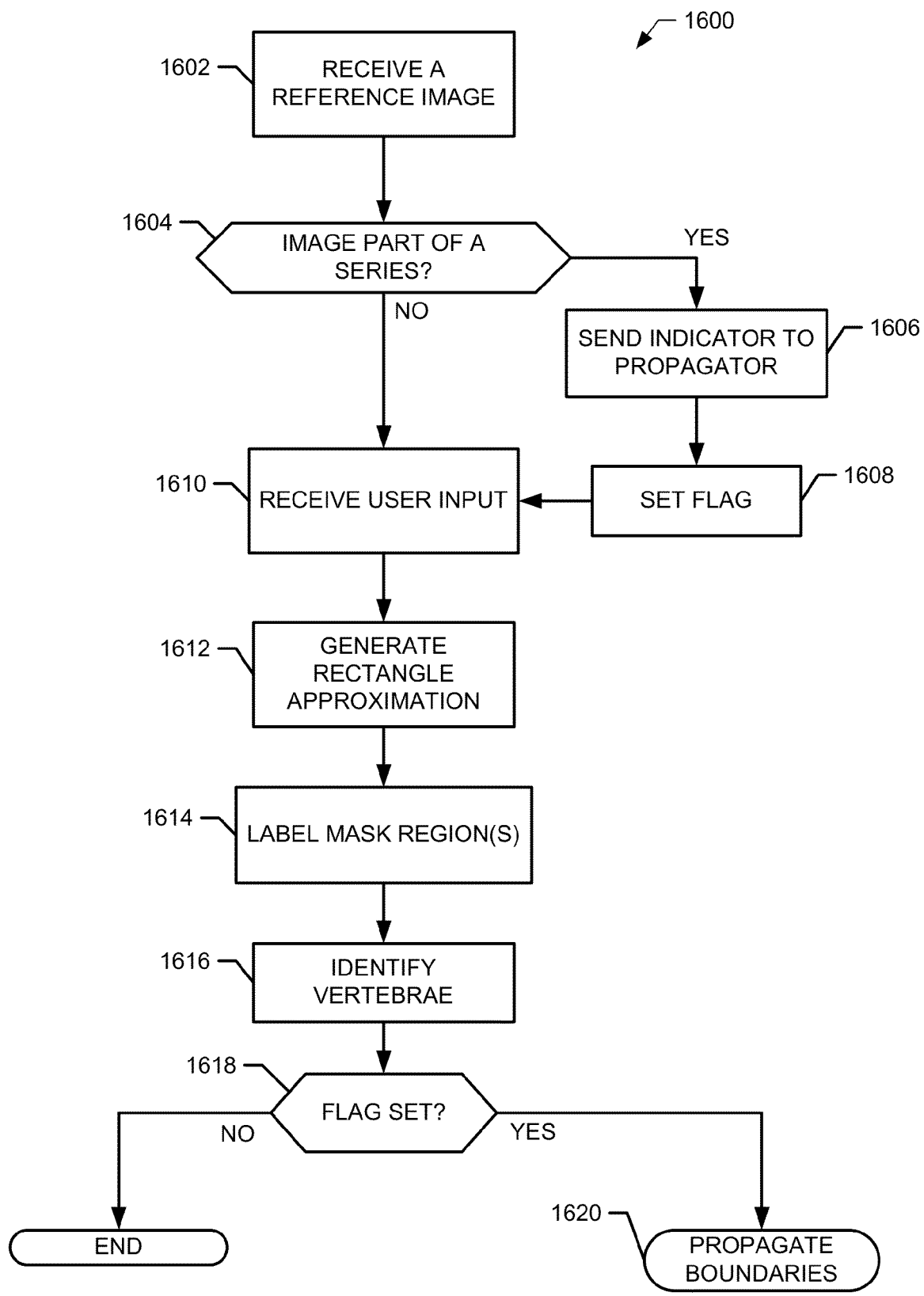
FIG. 16 is a flowchart representative of example machine readable instructions that may be executed to implement the example vertebra detector of FIG. 10.
Figure 17:
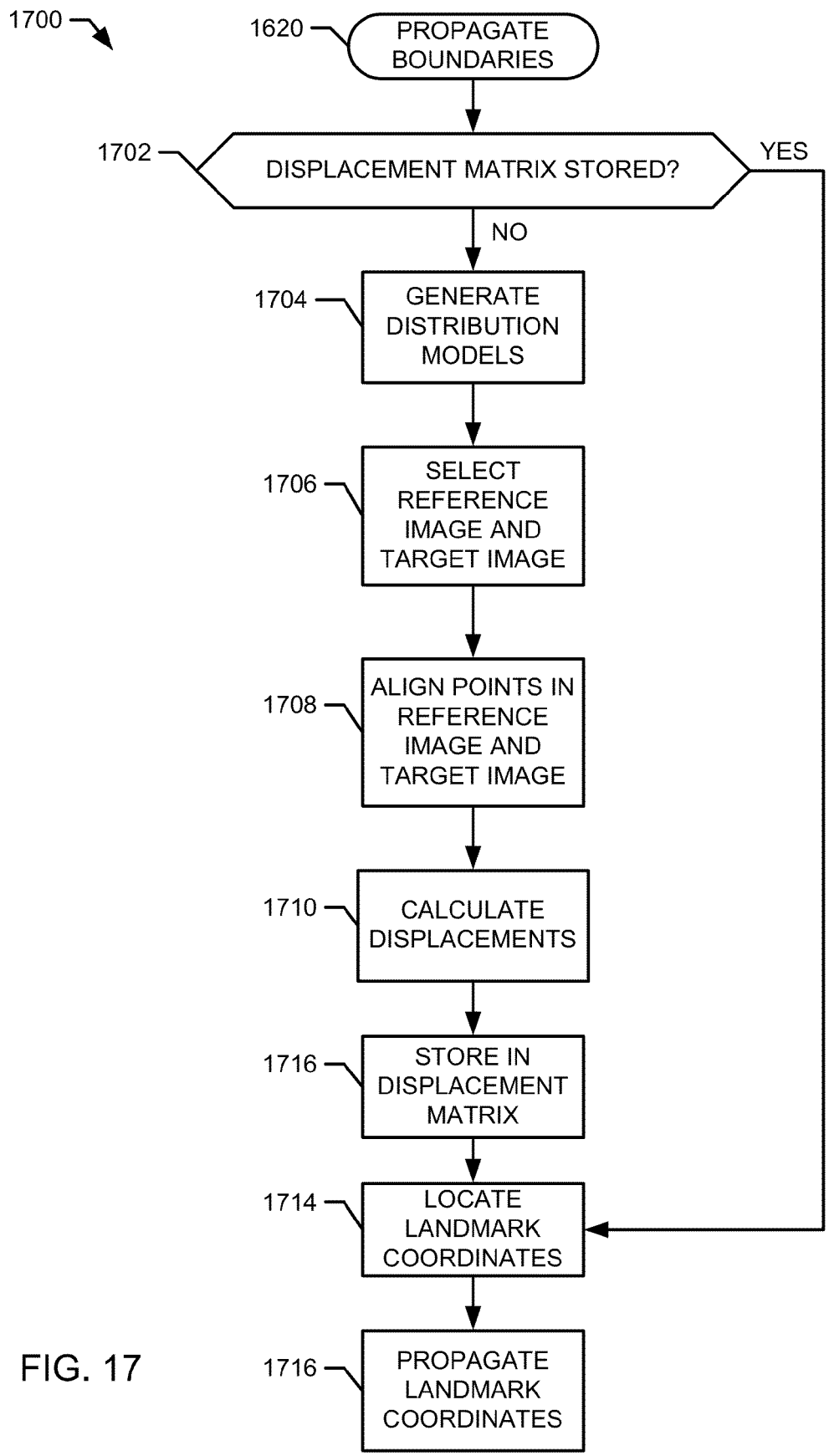
FIG. 17 is a flowchart representative of example machine readable instructions that may be executed to implement the example propagator of FIG. 10.

Flowcharts representative of example machine readable instructions for implementing the vertebra detector 100 of FIG. 1 and/or the vertebra detector 1000 of FIG. 10 are shown in FIGS. 15, 16 and 17. In the illustrated examples, the machine readable instructions comprise a program for execution by a processor such as the processor 1812 shown in the example processing platform 1800 discussed below in connection with FIG. 18. The program may be embodied in software stored on a tangible computer readable medium such as a CD-ROM, a floppy disk, a hard drive, a digital versatile disk (DVD), a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowcharts illustrated in FIGS. 15, 16 and 17, many other methods of implementing the example vertebra detector 100 and/or the example vertebra detector 1000 may alternatively be used. For example, the order of execution of the blocks may be changed, and/or some of the blocks described may be changed, eliminated, or combined.

As mentioned above, the example processes of FIGS. 15, 16 and 17 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage medium and to exclude propagating signals. Additionally or alternatively, the example processes of FIGS. 15, 16 and 17 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 15 illustrates a flow diagram for an example method or process 1500 to automatically detect a vertebra in a spine image. At block 1502, a rectangle approximation of a reference (e.g., initial) vertebra identified by a healthcare practitioner (e.g., a radiologist, physician and/or technician) is generated. In some examples, the healthcare practitioner indicates three corners of a reference vertebra in a spine image by selecting three points on a display of the spine image. The example rectangle approximator 102 uses the three known corners of the initial vertebra to approximate a rectangle approximation of the reference vertebra. For example, by knowing the location of three corners of the reference vertebra, the rectangle approximator 102 approximates the location of the fourth corner of the reference vertebra. The example rectangle approximator 102 uses the four corners (e.g., the three known corners and the fourth approximated corner) to generate a rectangle approximation of the reference vertebra by drawing lines from one corner to the next. The example rectangle approximator 102 communicates the approximated rectangle of the reference vertebra to the example mask region analyzer 104 and the example shape analyzer 106.

At block 1504, the example mask region analyzer 104 identifies a mask similar to the image intensity (e.g., distribution of pixels) of the approximated rectangle of the reference vertebra. For example, the distance calculator 308 compares the similarity between the image intensity of the approximated rectangle to the image intensity of a mask. At block 1506, the identified mask most similar to the rectangle approximation in pixel intensity is used to label mask region(s) within the mask. For example, two adjacent pixels within the mask with similar distribution of pixels are labeled as the same mask region.

At block 1508, the example shape analyzer 106 compares the shape of the rectangle approximation to the shape of the labeled mask regions. For example, the window generator 704 generates a window including a labeled mask region(s). The mask region within the window closest in shape to the rectangle approximation is detected as a vertebra. In some examples, the shape analyzer 106 stores the boundary of the identified vertebra in a storage device, such as the example storage device 108.

FIG. 16 illustrates a flow diagram for an example method or process 1600 to automatically detect a vertebra in the spine image and whether the landmark (e.g., the vertebra boundary) is to propagate through a series of images. At block 1602, the example series checker 1010 of the example vertebra detector 1000 receives a reference image. At block 1604, the example series checker 1010 determines whether the reference image is one image in a series of images. For example, the series checker 1010 may check metadata included with the reference image to see if the reference image is part of a series of images. At block 1606, if the reference image is part of a series, the example series checker 1010 outputs an indicator to the example propagator 1012. As described below in connection with FIG. 17, the example propagator 1012 checks whether a displacement matrix describing the series of images is stored in the matrix storage device 1118. At block 1608, the example series checker 1010 also sets a series flag (e.g., flag=1) at the example shape analyzer 1006 indicating the reference image is part of a series of images.

At block 1610 in the illustrated example of FIG. 16, the example rectangle approximator 1002 receives user input from a healthcare practitioner. For example, the healthcare practitioner selects three corners of a reference vertebra in a reference image of a spine. At block 1612, the example rectangle approximator 1002 generates a rectangle approximation of the reference vertebra based on the user input. The example mask region analyzer 1004 builds a statistical distribution model of the rectangle approximation based on the pixel distribution within the rectangle approximation. The example mask region analyzer 1004 uses this distribution model to identify a mask (e.g., a binary mask) similar to the rectangle approximation based on image intensity. At block 1614, this mask is used to label mask regions within the mask. Using the rectangle approximation of the reference vertebra, the example shape analyzer 1006 compares the shape of the labeled mask regions with the shape of the reference vertebra. For example, the shape analyzer 1006 builds a statistical distribution model describing the rectangle approximation based on the distribution of distances from the centroid of the rectangle approximation to each of the pixels on the border of the rectangle approximation. At block 1616, the mask regions most similar to the shape of the rectangle approximation are labeled as vertebrae in the spine image and the boundary of each identified (e.g., detected) vertebra is stored. At block 1618, once the example shape analyzer 1006 is done comparing the mask regions, the example shape analyzer 1006 checks the status of the series flag. At block 1620, if the series flag is set (e.g., flag=1), the boundaries and/or landmarks are propagated through the series of images. If the series flag is not set (e.g., flag=0), the process ends.

FIG. 17 illustrates a flow diagram for an example method or process 1700 to propagate a landmark through a series of images. At block 1702, the example propagator 1012 determines whether a displacement matrix describing the input series of images is stored in a storage device. For example, the storage checker 1102 checks the matrix storage device 1118 if a displacement matrix describing the input series of images is stored. At block 1714, and as described in further detail below, when the example storage checker 1102 determines the displacement matrix is stored, the example propagator 1012 locates the pixel coordinates of each landmark in the reference image. On the other hand, when no displacement matrix describing the series of images is stored in the storage device, at block 1704, the example distribution model generator 1104 generates probability density estimates describing each image in the series of images based on the distribution of pixels in the image (e.g., image intensity).

At block 1706, the example image selector 1108 selects a reference image and a target image to align. In the illustrated example, during the initial selection, the reference image is selected by determining the mid-point image in the series of images. On the other hand, if a reference image and target image were previously selected, the previous target image is selected as the new reference image and a neighboring image is selected as the new target image. At block 1708, when the reference image and target image are selected, the reference image is aligned with the target image. For example, the images are aligned based on the statistical distribution models generated by the example distribution model generator 1104. At block 1710, once aligned, the displacement between the pixel coordinates in the reference image and the corresponding pixel coordinates in the target image is calculated of each pixel. At block 1712, each calculated displacement is stored in a storage device such as the example matrix storage device 1118.

At block 1714, when the example propagator 1012 receives a reference image with labeled landmarks (e.g., vertebrae boundaries, text annotations, etc.), the example landmark locator 1114 locates the pixel coordinates of each landmark in the reference image. In some examples, the landmark locations are automatically detected. For example, the example vertebra detector 1000 detects the vertebrae boundaries in a reference image. Additionally and/or alternatively, the user (e.g., a healthcare practitioner) manually selects/deselects landmarks in the reference image. At block 1716, once the landmark locations in the reference image are located, the example landmark propagator 1116 uses the displacements stored in the displacement matrix to calculate the corresponding landmark location in each of the target images. For example, if the user decides to review images 1 through 12 of a 12 image series, the example landmark propagator 1116 displays in images 1 through 12 the location of each landmark located in the reference image.

Figure 18:
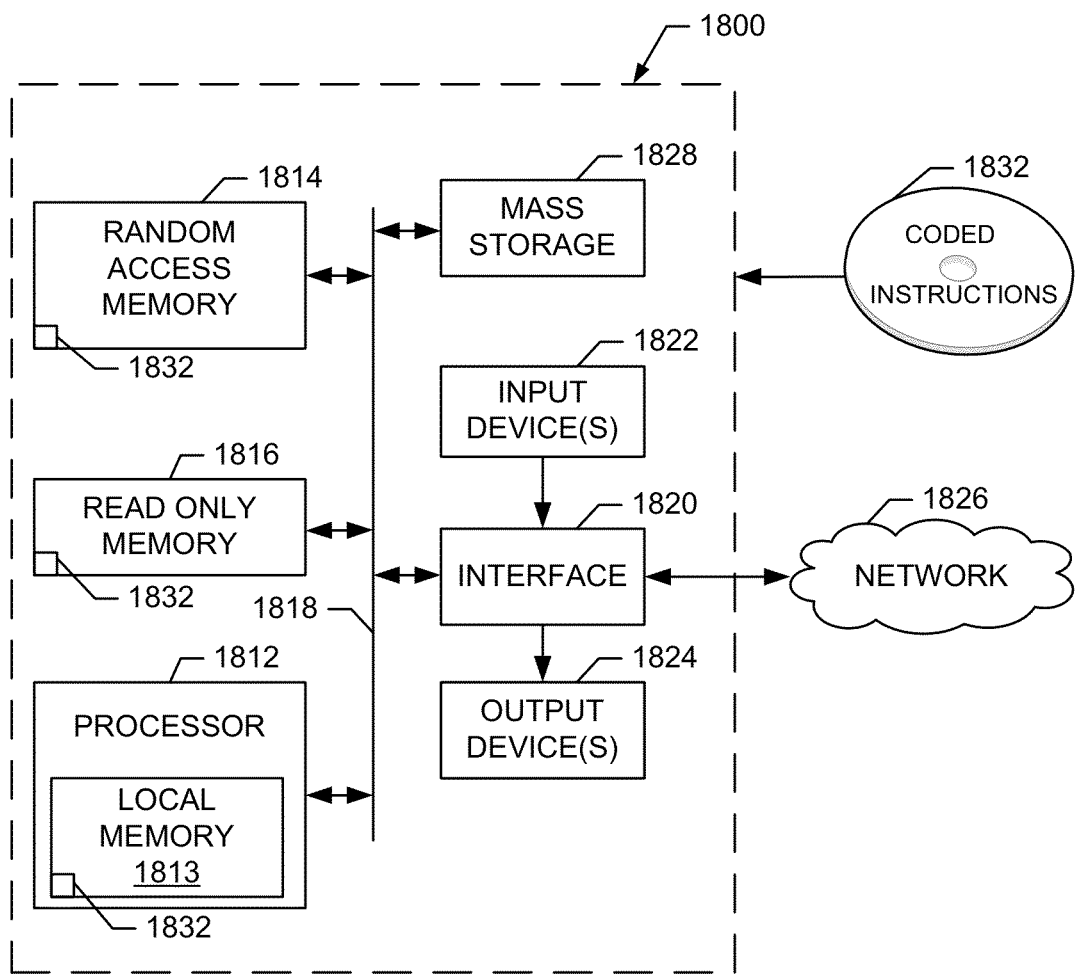
FIG. 18 is a block diagram of an example processing platform capable of executing the machine readable instructions of FIGS. 15, 16 and 17 to implement the example vertebra detector of FIGS. 1 and/or 10.

FIG. 18 is a block diagram of an example processing platform 1800 capable of executing the instructions of FIGS. 15, 16 and 17 to implement, for example, the vertebra detector 100 and/or the vertebra detector 1000 of FIGS. 1 and/or 10. The processing platform 1800 can be, for example, a server, a personal computer, an audience measurement entity, an Internet appliance, a DVD player, a CD player, a digital video recorder, a Blu-ray player, a gaming console, a personal video recorder, a set top box, or any other type of computing device.

The processing platform 1800 of the instant example includes a processor 1812. For example, the processor 1812 can be implemented by one or more microprocessors or controllers from any desired family or manufacturer.

The processor 1812 includes a local memory 1813 (e.g., a cache) and is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processing platform 1800 also includes an interface circuit 1820. The interface circuit 1820 may be implemented by any type of interface standard, such as an Ethernet interface, a universal serial bus (USB), and/or a PCI express interface.

One or more input devices 1822 are connected to the interface circuit 1820. The input device(s) 1822 permit a user to enter data and commands into the processor 1812. The input device(s) can be implemented by, for example, a keyboard, a mouse, a touchscreen, a track-pad, a trackball, isopoint and/or a voice recognition system.

One or more output devices 1824 are also connected to the interface circuit 1820. The output devices 1824 can be implemented, for example, by display devices (e.g., a liquid crystal display, a cathode ray tube display (CRT), a printer and/or speakers). The interface circuit 1820, thus, typically includes a graphics driver card.

The interface circuit 1820 also includes a communication device such as a modem or network interface card to facilitate exchange of data with external computers via a network 1826 (e.g., an Ethernet connection, a digital subscriber line (DSL), a telephone line, coaxial cable, a cellular telephone system, etc.).

The processing platform 1800 also includes one or more mass storage devices 1828 for storing software and data. Examples of such mass storage devices 1828 include floppy disk drives, hard drive disks, compact disk drives and digital versatile disk (DVD) drives. The mass storage device 1828 may implement the local storage device.

The coded instructions 1832 of FIGS. 15, 16 and 17 may be stored in the mass storage device 1828, in the volatile memory 1814, in the non-volatile memory 1816, and/or on a removable storage medium such as a CD or DVD.

From the foregoing, it will appreciate that disclosed methods and systems describe automated, accurate, fast and reproducible detection of vertebrae boundaries in spine images. The methods and systems allow computing automatically several diagnosis measures such as vertebrae dimensions, disc dimensions, disc intensity statistics and disc bulging benchmarks. The methods and systems allow quantitative and reproducible reporting of spinal deformities/diseases, and can improve significantly the accuracy and processing time of spine-analysis procedures. The methods and systems allow automatically propagating any label placed on a reference image to the rest of the images in the series and to annotate the corresponding anatomical landmarks accurately.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to detect a vertebra in a spine image, the method comprising:
   generating, using a processor, a rectangle approximation of a reference vertebra in the spine image;
   identifying, in the spine image, a mask similar to the rectangle approximation;
   labeling a mask region in the mask;
   comparing a shape of the mask region to the rectangle approximation; and
   detecting a vertebra in the spine image based on the comparison.

2. A method as defined in claim 1 wherein generating the rectangle approximation further comprises:
   identifying a plurality of points of the reference vertebra; and
   generating the rectangle approximation based on the plurality of points.

3. A method as defined in claim 2 wherein the plurality of points is input by a user.

4. A method as defined in claim 1 wherein the mask is a first mask, and wherein identifying the mask similar to the rectangle approximation further comprises:
   describing the rectangle approximation based on a distribution of pixels corresponding to the rectangle approximation;
   generating a second mask based on a status of each pixel corresponding to pixels in the spine image;
   calculating a similarity score between the description of the rectangle approximation and the second mask; and
   identifying the second mask as the first mask when the similarity score exceeds a threshold.

5. A method as defined in claim 4 wherein describing the rectangle approximation includes building a statistical distribution model based on image intensity.

6. A method as defined in claim 4 wherein generating the mask further comprises:
   calculating a first value when a pixel is in an ON status;
   calculating a second value when the pixel is in an OFF status; and
   storing the status of the pixel based on a difference between the first value and the second value.

7. A method as defined in claim 4 wherein the similarity score includes a similarity measure and a smoothing factor.

8. A method as defined in claim 4 wherein identifying the mask further comprises:
   calculating a first similarity score between the second mask and the rectangle approximation;
   calculating a second similarity score, the second similarity score calculated prior to the first similarity score; and comparing the difference of the first similarity score and the second similarity score to a threshold.

9. A method as defined in claim 1 wherein labeling the mask region further comprises:
comparing a first pixel to a second pixel neighboring the first pixel in the mask; and
labeling the first pixel and the second pixel based on the comparison.

10. A method as defined in claim 9 wherein the comparison of the first pixel and the second pixel is based on pixel intensity of the first pixel and the second pixel.

11. A method as defined in claim 1 wherein comparing the labeled mask region to the rectangle approximation further comprises:
describing a shape of the rectangle approximation;
describing the shape of the mask region; and
comparing the shape of the rectangle approximation to the shape of the mask region.

12. A method as defined in claim 11 wherein describing the shape of the rectangle approximation further comprises:
identifying a centroid of the rectangle approximation;
calculating a distance from the centroid to a pixel on a boundary of the rectangle approximation; and
building a model based on the calculated distances.

13. A method as defined in claim 1 wherein labeling respective mask regions in the mask further comprises identifying discs.

14. A method as defined in claim 1 further comprising:
locating a landmark on a reference image;
determining whether the reference image is included in a series of images; and
when the reference image is included in the series of images, locating the landmark in the remaining images of the series of images.

15. A method as defined in claim 14 wherein the reference image is the spine image.

16. A method as defined in claim 14 wherein the landmark is a vertebra detected in the spine image.

17. A method as defined in claim 14 wherein non-rigid image registration is used to locate the landmark in the remaining images.

18. A method as defined in claim 14 wherein the landmark is identified by a user.

19. A system to detect vertebra in a spine image, comprising:
a processor coupled to a memory and programmed to:
determine whether the spine image is included in a series of images;
generate a rectangle approximation of a reference vertebra in the spine image;
identify a mask similar to the rectangle approximation based on a comparison of image intensity;
label mask regions in the mask based on a comparison of pixel intensity;
generate a window including a portion of the mask;
compare a plurality of mask regions within the window to the rectangle approximation based on a shape of each mask region and a shape of the rectangle approximation;
identify the mask region closest to the shape of the rectangle approximation as a vertebra; and
propagate the location of the vertebra to the remaining images in the series of images when the spine image is included in the series of images.

20. A tangible computer readable storage medium including computer program code to be executed by a processor, the computer program code, when executed, to implement a method to detect a vertebra in a spine image, the method comprising:
generating a rectangle approximation of a reference vertebra in the spine image;
identifying, in the spine image, a mask similar to the rectangle approximation;
labeling a mask region in the mask;
generating a window including a portion of the mask;
comparing a shape of a mask region within the window to the rectangle approximation; and
determining whether the mask region is the vertebra based on the comparison.

21. A tangible computer readable medium as defined in claim 20 wherein identifying the mask similar to the rectangle approximation further comprises:
describing the rectangle approximation based on a distribution of pixels corresponding to the rectangle approximation;
generating a mask based on a binary status of each pixel corresponding to pixels in the spine image;
calculating a similarity score between the description of the rectangle approximation and the mask; and
identifying the mask when the similarity score exceeds a threshold.

22. A tangible computer readable medium as defined in claim 21 wherein identifying the mask further comprises:
calculating a first similarity score between the mask and the rectangle approximation;
calculating a second similarity score, the second similarity score calculated prior to the first similarity score; and
comparing the difference of the first similarity score and the second similarity score to a threshold.

23. A tangible computer readable medium as defined in claim 20 wherein labeling the mask region in the mask further comprises:
comparing a first pixel to a second pixel neighboring the first pixel in the mask; and
labeling the first pixel and the second pixel based on the comparison.

24. A tangible computer readable medium as defined in claim 20 wherein comparing the shape of the mask region within the mask to the rectangle approximation further comprises:
describing a shape of the rectangle approximation;
describing the shape of the mask region; and
comparing the shape of the rectangle approximation to the shape of the mask region.

25. A tangible computer readable medium as defined in claim 20 further comprising:
locating a landmark on a reference image;
determining whether the reference image is located in a series of images; and
when the reference image is included in the series of images, locating the landmark in remaining images of the series of images.

* * * * *